(12) United States Patent
Bessonov et al.

(10) Patent No.: US 9,904,733 B2
(45) Date of Patent: Feb. 27, 2018

(54) NAME HIERARCHIES FOR MAPPING PUBLIC NAMES TO RESOURCES

(75) Inventors: Vladilen V. Bessonov, Issaquah, WA (US); Todd D. Ostermeier, Kenmore, WA (US); Paul B. Lorah, Redmond, WA (US); Christopher O'Neil Sanders, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1913 days.

(21) Appl. No.: 12/688,087

(22) Filed: Jan. 15, 2010

(65) Prior Publication Data

US 2011/0179040 A1   Jul. 21, 2011

(51) Int. Cl.
*G06F 17/30* (2006.01)
*H04L 29/12* (2006.01)

(52) U.S. Cl.
CPC ........ *G06F 17/30876* (2013.01); *H04L 61/30* (2013.01); *H04L 29/12009* (2013.01); *H04L 61/15* (2013.01); *H04L 61/35* (2013.01)

(58) Field of Classification Search
CPC ......... H04L 61/15; H04L 61/30; H04L 61/35; H04L 29/12009; G06F 17/30
See application file for complete search history.

(56) References Cited

U.S. PATENT DOCUMENTS

| | | | |
|---|---|---|---|
| 5,958,008 A | 9/1999 | Pogrebisky et al. | |
| 6,035,330 A | 3/2000 | Astiz et al. | |
| 6,476,833 B1 * | 11/2002 | Moshfeghi | G06F 17/30867 707/E17.109 |
| 6,578,078 B1 | 6/2003 | Smith et al. | |
| 6,882,999 B2 | 4/2005 | Cohen et al. | |
| 7,103,645 B2 * | 9/2006 | Leighton | G06F 17/3089 707/E17.119 |
| 7,117,227 B2 * | 10/2006 | Call | A61L 2/10 707/999.101 |
| 7,197,565 B2 * | 3/2007 | Abdelaziz et al. | 709/226 |

(Continued)

OTHER PUBLICATIONS

Patton Tony, "Improve Usability with Friendly URLs ", Retrieved at<<http://articles.techrepublic.com.com/5100-10878_11-6183568.html>>, May 14, 2007, pp. 1-4.

(Continued)

*Primary Examiner* — Patrice Winder
*Assistant Examiner* — Angela Widhalm De Rodri
(74) *Attorney, Agent, or Firm* — Cooper Legal Group, LLC

(57) ABSTRACT

A resource set comprising a set of resources may be provided to the public. It may be desirable to associate with the resources a set of public names, such as friendly URLs that may be more memorable, may indicate to users the type of resource so named, and may promote indexing of the resources by search engines. A name hierarchy (such as a portion of a file system) may store at least one reference that associates a public name with a resource. A name hierarchy navigation logic may facilitate navigation through the name hierarchy, and may specify a particular location within the name hierarchy where a reference associated with the public name is to be stored. This manner of associating public names with resources may promote the scalability and efficiency in associating public names with resources and in retrieving a resource associated with a particular public name.

20 Claims, 12 Drawing Sheets

(56) References Cited

U.S. PATENT DOCUMENTS

| | | | |
|---|---|---|---|
| 7,266,616 B1* | 9/2007 | Munshi | G06T 15/00 709/246 |
| 7,293,012 B1 | 11/2007 | Solaro et al. | |
| 7,341,195 B2* | 3/2008 | Cimino | 235/487 |
| 7,412,503 B2* | 8/2008 | Chess et al. | 709/223 |
| 7,716,634 B2* | 5/2010 | Ross et al. | 717/106 |
| 7,730,155 B1* | 6/2010 | Meyer | H04W 4/02 709/201 |
| 7,797,627 B2* | 9/2010 | Fong et al. | 715/249 |
| 7,860,895 B1* | 12/2010 | Scofield et al. | 707/802 |
| 7,899,915 B2* | 3/2011 | Reisman | G06F 17/30873 709/227 |
| 7,917,584 B2* | 3/2011 | Arthursson | 709/205 |
| 7,954,052 B2* | 5/2011 | Curtis | G06F 17/30896 715/209 |
| 8,117,187 B2* | 2/2012 | Mostl | 707/716 |
| 8,250,236 B2* | 8/2012 | Betts et al. | 709/245 |
| 8,539,481 B2* | 9/2013 | Smith et al. | 718/1 |
| 9,141,717 B2* | 9/2015 | Schneider | G06F 17/30887 |
| 2004/0230572 A1* | 11/2004 | Omoigui | 707/3 |
| 2005/0203918 A1* | 9/2005 | Holbrook | 707/10 |
| 2009/0063538 A1* | 3/2009 | Chitrapura et al. | 707/102 |
| 2009/0240728 A1* | 9/2009 | Shukla et al. | 707/103 R |
| 2010/0146036 A1* | 6/2010 | Castro et al. | 709/202 |
| 2010/0262694 A1* | 10/2010 | Havemose | 709/226 |

OTHER PUBLICATIONS

Gunderloy Mike, "URL Mapping in Asp.Net 2.0", Retrieved at<<http://www.developer.com/article.php/3581326>>, Jan. 30, 2006, pp. 5.

Slawski Bill, "IBM and Shadow Pages", Retrieved at, <<http://www.seobythesea.com/?p=157>>, Mar. 31, 2006, pp. 1-5.

"Friendly URL ", Retrieved at<<http://sdk.episerver.com/library/CMS5/Developers%20Guide/Friendly%20URL.htm?id=24873>>, Nov. 9, 2009, pp. 1-8.

* cited by examiner

NAME HIERARCHIES FOR MAPPING PUBLIC NAMES TO RESOURCES

BACKGROUND

Within the field of computing, many scenarios involve one or more resources (e.g., files, data objects, documents, libraries, applications, images, videos, devices, or user profiles, or a combination thereof) that may be exposed by a device (such as a server) to various clients (such as users, applications, processes, and other devices.) Various resources may be stored in a resource set (such as a file system or a database) that may have a particular structure or organizational scheme (such as a hierarchy, a set of related tables, or a simple list), and that may be requested by clients according to such names or identifiers. Moreover, the resource set may be distributed over one or more devices, e.g., in a server farm scenario that appears to clients as a single resource service but that comprises a set of servers that redundantly store and/or access the resources in order to promote the accessibility, reliability, and/or performance of the resource service, or in a mesh comprising a set of devices that coordinate to present a consistent computing environment to a user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In some scenarios involving a resource set comprising one or more resources, it may be desirable to present the resources differently than may be stored in the resource set. As a first example, a resource may have a particular name or identifier in the resource set, but it may be desirable to expose the resource with a different "public" name, such as a "friendly name" that may more easily remembered and/or may promote a semantically accurate indexing of the resource by a search engine. As a second example, the resources may be stored in the resource set in a particular manner, but it may be desirable to present the resources as if structured in a different manner, such as a more intuitive hierarchy that suggests a more user-friendly organization of the resources. As a third example, it may be desirable to permit a resource to have several names, to be named or renamed in an arbitrary manner, and/or to be organized to an easily changeable and fluid structure, without breaking references to the resource (which may be stored according to a fixed identifier of the resource.)

Some or all of these and other advantages may be achievable by implementing a mapping of resources from a "public name," which may comprise any arbitrary name (and that may suggest a particular structure of the resource set), to the actual resource stored in the resource set. Presented herein is one such technique that may present particular advantages, such as efficiently utilizing existing resources of the device hosting the resource set, permitting robustness and flexibility in the mapping of public names to resources, and promoting scalability of the resource set among a potentially large set of devices (such as servers.) In this technique, a name hierarchy is generated (such as by designating a portion of a file system), where a public name of a resource may be used to navigate to a particular location (distinctive to the public name) in the name hierarchy. When a public name is assigned to a resource, a reference to the resource may be stored at the corresponding location in the name hierarchy, where the reference identifies the resource in the resource set (e.g., by specifying a distinctive identifier that may be used internally to identify the resource.) When a request for a resource having a particular public name is received, the name hierarchy may be navigate according to the public name, a reference to the resource (stored in the name hierarchy at the location designated by the public name) may be retrieved, and the reference may be used to identify and retrieve the resource from the resource set. In this manner, an arbitrary public name of the resource may be mapped to the resource in the resource set. In this manner, the public name may suggest a fictitious hierarchy of the resource set, such as a user-friendly organization or a "friendly URL" of the resource to promote search engine indexing, and the mapping of the public name to the resource may be achieved using existing resources and that promotes scalability in more complex computing scenarios.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
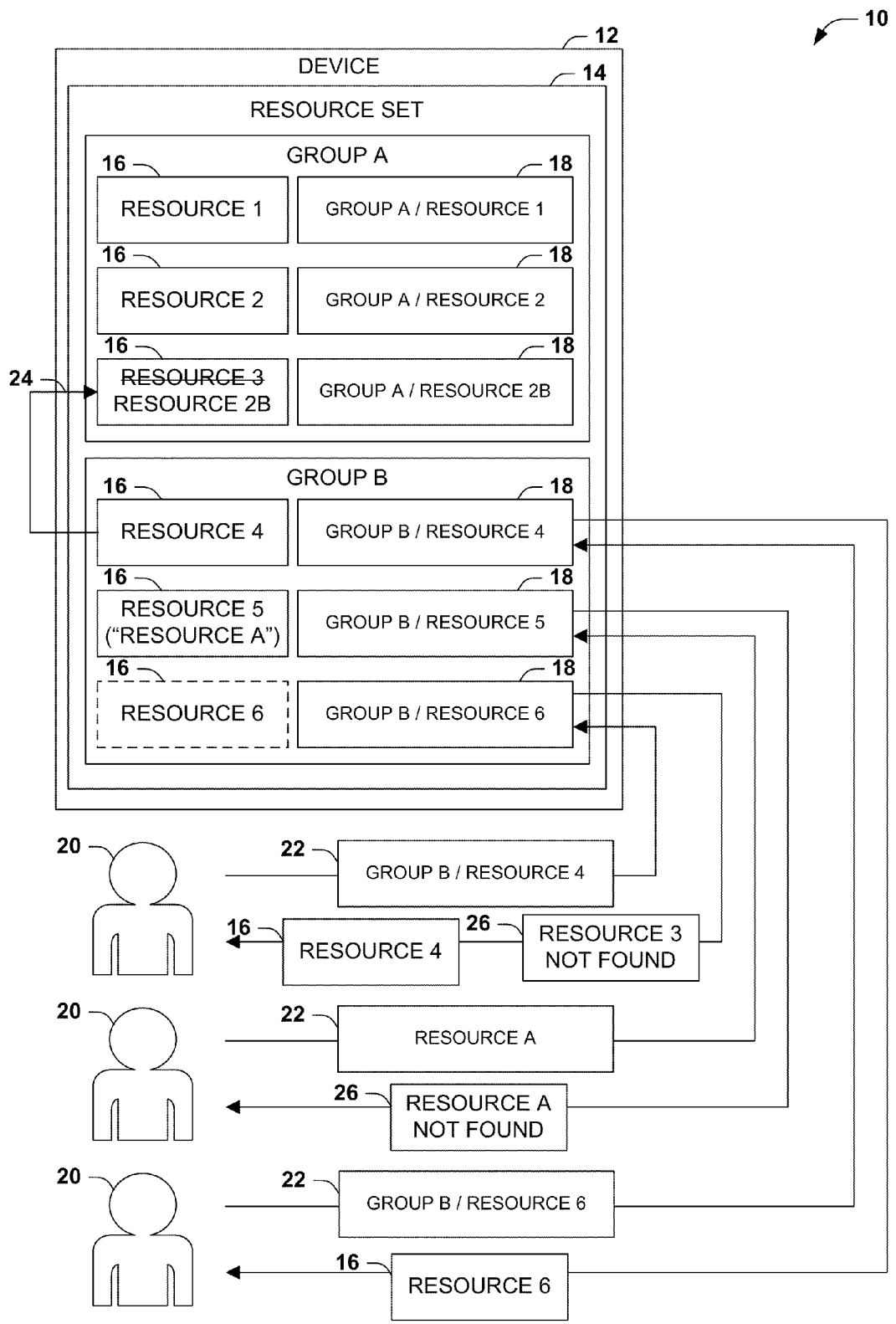
FIG. 1 is an illustration of an exemplary scenario featuring a set of resources provided to a set of users.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the provision by a device of a resource set comprising a set of resources to one or more clients. For example, a fileserver may present a file system comprising a set of files; a database server may present a database comprising a set of database objects, including tables and records; and a webserver may present a website comprising a set of web pages. These resources may be presented to a diverse set of clients, such as a user, another device, or an application or process, each of which may access the resources in various ways and to achieve various tasks. Moreover, in some such scenarios, a set of devices may coordinate to present the resource set to clients. For example, in a server farm, many servers interoperate to present a resource set in a unified manner, and may thereby provide better performance (such as faster accessing via concurrent processing) or reliability (through redundancy in case of a server failure) than a single server; and in a mesh scenario, a set of devices may cooperate to present to the user a consistent computing environment featuring a set of data objects that are distributed across the devices, but that are presented to the user as a single object hierarchy.

A client may access various resources of the resource set by submitting to the device a request that identifies the resource(s) to be accessed by a public name. For example, a user may request a file of a file system according to a filename; a data-bound application may request to access a database record in a particular database according to a particular database identifier, such as a key; and a visitor of a website may request a web page associated with a particular Uniform Resource Identifier (URI). Moreover, the public name of the resource may inform the user as to the type and nature of the resource. For example, a hierarchical path to the resource that is included in the name may assist the user in navigating the hierarchical structure of the resource set; the name of the resource may facilitate the user in identifying the content or subject matter of the resource; and an extension of the resource name (such as ".doc", ".html", and ".pdf") may facilitate the user in identifying the type or class of data comprising the resource.

FIG. 1 presents an exemplary scenario 10 featuring a first technique wherein a device 12 (such as a server) exposes a resource set 14 to a set of clients, including a set of users 20. The resource set 14 includes various resources 16 having different names, such as "Resource 1" and "Resource 2". In this example, these resources are organized into groups, such as "Group A" and "Group B," such as a portion of a file system or other hierarchy. The resources 16 in this example are then referred to as a concatenation of the group name and the name of the resource, such as "Group A/Resource 1" and "Group B/Resource 4". Users 20, acting as clients of the device 12, may request requests 22 for such resources 16 by specifying the name of the resource 16, and the device 12, upon receiving such a request 22, may search the resource 16 and provide the resource 16 in response to the request 22. In this manner, the resources 16 are identified by a public name 18, based on the concatenation of the name o the group and the name of the resource 16. This scenario may resemble a simple file server offering a set of files as a simple hierarchical file system.

While the exemplary scenario 10 of FIG. 1 presents a comparatively simple technique for exposing resources 16 based on these public names 22, some problems may arise as the exemplary scenario 10 changes. As a first example, in some such scenarios, resources 16 may refer to each other; e.g., a fourth resource 16 may have an association 24 with a third resource 16, such that when a request for the fourth resource 16 is issued, the device 12 identifies the association 24 and also provides the third resource 16. (This example may occur, e.g., in the exemplary scenario of a webserver, where a first web object embeds a second web object, such that when a user directs a web browser to retrieve the first web object, the browser automatically retrieves the second web object for inclusion in the rendering.) If the name of the third resource 16 changes, e.g., from "Resource 3" to "Resource 2B," the association 24 may be broken, and when a first user 20 issues a request 22 for the fourth resource 16, the device produces the fourth resource 16, but cannot find the third resource 16 and therefore returns an error message 26.

As a second exemplary problem illustrated in FIG. 1, it may be desirable to assign a different name to a resource 16, such as a different public name 18 than the concatenation of the location and name of the resource 16, or an alias of the resource 16 that an administrator of the device 12 may choose for the resource 16. For example, an administrator of a website may endeavor to identify a particular resource 16 according to a "friendly URL," which may be easier for users 20 to remember, easier to enter via text entry into a web browser, and/or easier for search engines to identify and to index properly as a particular type of data or object. However, in this simple scenario, the public name 18 of each resource 16 matches the name and location of the resource 16, and no facility is provided for assigning aliases or multiple names to a resource 16. Therefore, if the administrator wishes to expose the fifth resource 16 (having the public name "Group B/Resource 5") with a different public name of "Resource A," the device 12 may be incapable of achieving this aliasing, and a request f22 submitted by a second user 20 for "Resource A" may result in an error message 26 (e.g., "404 Not Found.")

As a third exemplary problem illustrated in FIG. 1, it may be undesirable to expose resources 16 with public names 18 that reveal some aspects of the resource set 14, such as the structure of the hierarchy or naming logic among the resources 16. As a first example, the public names 18 of the resources 16 correctly suggest that the resources 16 are internally stored in two groups. This suggestion may imply, e.g., some details about the file system or database structure of the device 12, which may be misused against the device 12 by an intruder. As a second example, the public names 18 of the resources 16 may suggest the manner whereby an administrator of the device 12 chooses names for resources 16. For example, the administrator may have named a particular resource 16 "Resource 6," in proper sequence with the first five resources 16, but may not have yet published the sixth resource 16 to the public. Nevertheless, a third user 20 might correctly infer the sequential nomenclature of the resources 16, and might try to find the sixth resource 16 by submitting a request 22 for "Group B/Resource 6," and the device 12 might provide the (properly requested) sixth resource 16 to the third user 20 against the wishes of the administrator.

These and other problems may be caused by the simple configuration of the device 12 to expose respective resources 16 with a public name 18 matching the location and name of the resource 16. Some of these problems might be ameliorated by some simple adjustments of this technique, e.g., by providing security settings that may restrict access to a resource 16 to some or no users 20, and/or by including an aliasing, shortcut, or other referencing technique in the resource accessing components of the device 12; however, these improvements may represent unnecessarily complexity or an ad hoc approach to addressing problems.

Alternative techniques for addressing these and other problems of the exemplary scenario 10 of FIG. 1 involves the introduction of a public name mapping layer, whereby a set of public names 18 may be assigned to the resources 16 of the resource set 12; e.g., the resources 16 may be internally stored and referenced in particular locations (such as within a hierarchy) and with a particular name, but a completely and arbitrarily different group of public names 18 may be attributed to such resources 16 for exposure to public clients. This technique may permit resources 16 to be assigned different public names 18 than the names corresponding to the locations and internal names thereof; to be assigned more than one public name 18, such as by inserting more than one public name 18 into the public name mapping; to be publicly renamed without interfering with the internal relationships thereamong; and to hide particular resources 16 from the public by withholding any public name 18 of the resource 16 from the public name mapping. In this manner, the device 12 may permit a more flexible naming of the resources 16, which may promote convenience of administration, accessibility of the resources 16 (such as by permitting aliases and "friendly names" thereof), robustness (such as by preserving associations 24 among resources 16 based on fixed internal names), and/or security of the device 12 (in withholding information that discloses structural and/or naming logic details of the device 12.)

Figure 2:
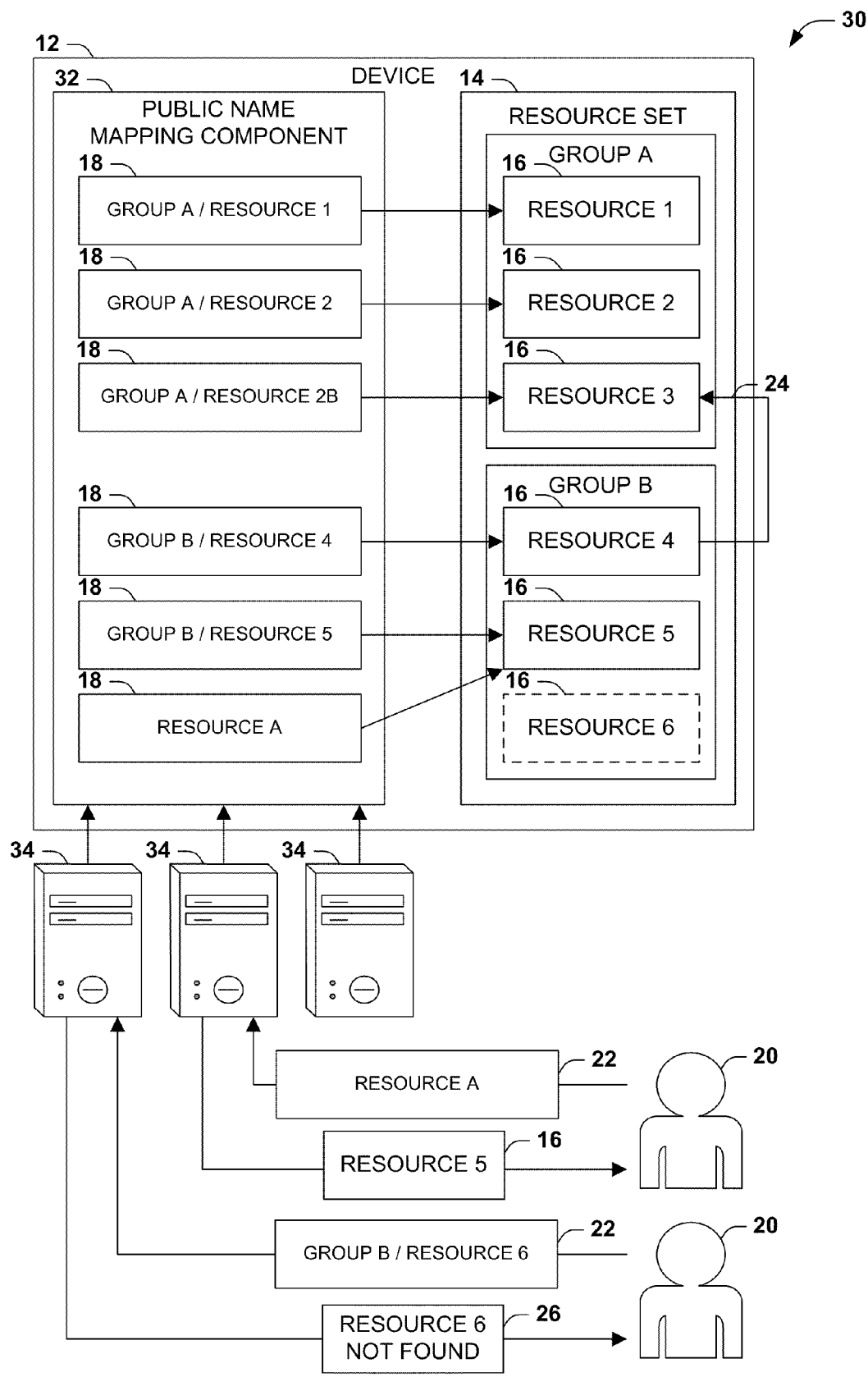
FIG. 2 is an illustration of an exemplary scenario featuring a set of resources provided to a set of users according to a set of public names.

These alternative techniques may be implemented in many ways. FIG. 2 presents an exemplary scenario 30 featuring a first exemplary implementation of these techniques, wherein the device 12 includes a public name mapping component 32 that associates public names 18 with various resources 16. The public name mapping component 32 may resemble, e.g., a software logic layer of the accessing component of the device 12, or a descriptor file (such as an Extensible Markup Language (XML) file) that specifies the public names 18 of various resources 16. The device 12 may, as a default public naming logic, associate with each resource 16 a public name 18 based on the location and internal name of the resource 16, but may permit an administrator to alter the public names 18, such as by creating new public names 18 (such as aliases), by changing public names 18, by removing public names 18 (such as to hide a resource 16 from the public), and/or by changing the default public naming logic of the resources 16. The device 12 may expose resources 16 to the public, and a client (such as a user 20) may issue a request 22 specifying the public name 18 of a resource 16.

The exemplary implementation of the device 12 illustrated in FIG. 2 technique may address several of the problems illustrated in the exemplary scenario 10 of FIG. 1. As a first example (not illustrated), when the first user 20 requests the fourth resource 16 using the public name 18 "Group B/Resource 4", the device 12 may deliver both the fourth resource 16 and the third resource 16 with which the fourth resource 16 has an association 24, even though the third resource 16 has been publicly renamed to "Group A/Resource 2B". As a second example, when the second user 20 requests the resource 16 having the public name 18 "Resource A," the device 12 may consult the public name mapping component 32 and may correctly retrieve and deliver the fifth resource 16, despite having an internal name and location that do not match this public name 18. As a third example, even if the third user 20 is able to infer the structural organization and naming logic of the device 12 by examining the public names 18 of other resources 16, when the third user 20 submits a request 20 that specifies the correct internal name of a resource 16 ("Group B/Resource 6"), the device 12 may fail to identify any such name in the public name mapping component 32, and may therefore return to the third user 20 an error message. In this manner, the device 12 may promote the association of public names 18 with resources 16 in a more flexible manner.

However, the exemplary implementation presented in FIG. 2 also illustrates some disadvantages. As a first example, the public name mapping component 32 may have to be developed as a separate process or layer, thereby increasing the complexity of the configuration of the device 12. This public name mapping component 32 may have to be developed to handle many requests 22 concurrently, while exhibiting high performance and efficiency. As a second example, this public name mapping component 32 may scale poorly to handle a large number of resources 16; e.g., it may be prohibitive to scan the elements of an XML file in order to locate a match of a particular public name 18. As a third example, it may be difficult to scale the public name mapping component 32 for concurrent use by many administrators; e.g., if implemented as a monolithic entity, such as a compiled programming layer with opaque logic or an XML file, it may be difficult for an administrator to examine or update the public names 18 of the resources 16, especially while another administrator or process is using the public name mapping component 32. The configuration of the public name mapping component 32 may also be unfamiliar to an administrator, thereby increasing the complexity of administration. As a fourth example, it may be difficult to implement this monolithic structure in an environment having many servers 34, such as in a server farm scenario where many servers 34 interoperate to present a unified service to a set of clients. Different servers 34 might concurrently update the public name 18 of a resource 16 (such as by writing an XML file at the same moment) and might cause a race condition; however, the inclusion of concurrency control mechanisms, such as locking, may undesirably consume additional resources of the device 12. The public name mapping component 32 might also be overwhelmed by the number of requests 22, and may exhibit poor service, timeout errors, or even a complete failure of service. These and other problems may result from a monolithic implementation of these techniques, such as illustrated in the exemplary scenario 30 of FIG. 2.

In view of these complexities, it may be desirable to develop a technique for enabling the public naming of resources 16 of a resource set 14 in a manner that promotes flexibility, scalability, and administrative convenience. For example, the implementation might utilize familiar and readily available resources of the device 12, thereby improving the ease of configuration and administration, reducing the development of new resources and consumption of resources (such as the development of a new monolithic entity, as in FIG. 2, that may run as a separate process with complex concurrency control mechanisms that consume resources.) Additionally, the implementation might rely on aspects of the device 12 that may be scalable to other servers 34, such as by permitting the distribution and synchronization of the mapping among the servers 34 of a server farm scenario.

Figure 3:
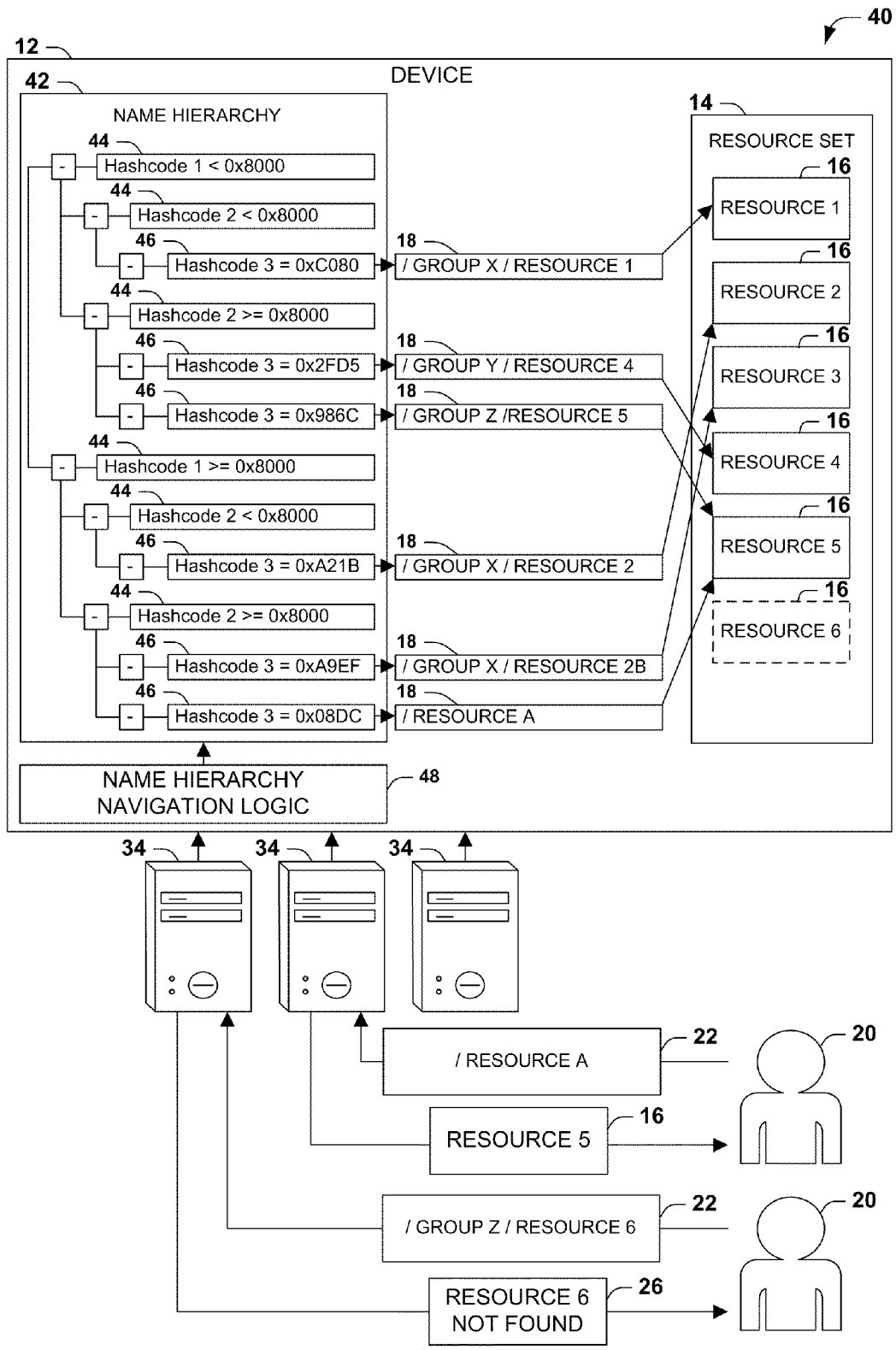
FIG. 3 is an illustration of an exemplary scenario featuring a set of resources provided to a set of users according to a set of public names in accordance with the techniques discussed herein.

FIG. 3 illustrates an exemplary scenario 40 featuring an embodiment of the techniques discussed herein, where a device 12 may be configured to provide access to a set of resources 16 through a set of public names 18 in a manner that promotes scalability, efficiency, and easy administration (e.g., as compared with the exemplary scenario 30 of FIG. 2.) In this exemplary scenario 40, the device 12 features a name hierarchy 42 comprising a set of navigation levels 44, where store public names 18 of resources 16 may be stored as a set of references 46 within a navigable hierarchy. The name hierarchy 42 may comprise, e.g., a portion of a file system of the device 12 that is allocated to store a set of files, where each file respectively represents a references 46 to a resource 16 based on a to a public name 18, and also references the resource 16 stored in the resource set 14 (e.g., by identifying a fixed identifier of the resource, such as a GUID.) Moreover, the references 46 may be stored in the name hierarchy 42 according to a name hierarchy navigation logic 48 that is configured to, for the public name 18 of a resource 16, specify a location in the name hierarchy 42 where a reference to the resource 16 may be stored and/or located.

In the exemplary scenario 40 of FIG. 3, the name hierarchy navigation logic 48 may be configured to specify navigation through the name hierarchy 42 in the following manner. First, the name hierarchy navigation logic 48 may specify that the name hierarchy 42 is organized as a two-tier set of folders (corresponding to two navigation levels 44 of the name hierarchy 42), and that each reference 46 is to be stored as a file of a particular name within the second tier of folders. For example, the name hierarchy navigation logic 48 may specify that, for a particular public name 18, a first hash is to be computed using a first hashing algorithm. In order to navigate this first navigation level 44 (beginning at the root of the portion of the file system comprising the name hierarchy 42), a first folder may be identified for containing references 48 for public names 18 having a first hash value less than a particular amount, and a second folder may be identified for containing references 48 for public names 18 having a first hash value greater than or equal to the specified amount. The name hierarchy navigation logic 48 may also specify that, after navigating this first level of folders, a second navigation level 44 may be negotiated by computing a second hashcode (using a second hashing algorithm) in order to identify a subfolder of the folder, and a second navigation may be performed at this navigation level 44 to arrive within a corresponding subfolder. Finally, within this corresponding subfolder, the name hierarchy navigation logic 48 may also specify a computation of a third hash (according to a third hashing algorithm) to specify the filename of the reference 46 corresponding to this public name 18.

In view of this name hierarchy navigation logic 48, references 46 to resources 16 based on a particular public name 18 may be unambiguously specified and quickly identified. For example, a particular public name 18 may be assigned to a resource 16 by invoking the name hierarchy navigation logic 48 to navigate through the name hierarchy 42, using the public name 18, and by saving at the location a file comprising a reference 46 to the resource 16 stored in the resource set 14. Similarly, when a client (such as a user 20) submits a request for a resource 16 having a particular public name 18, the device 12 may utilize the name hierarchy navigating logic 48 with the public name 18 to identify a location of a file comprising a reference 46 to the corresponding resource 16. If a file is found in this location, the reference 46 may be utilized to identify the resource 16 in the resource set 14, and to retrieve and provide the resource 16 in response to the request 22. However, if a file is not found in this location, the device 12 may report to the client that no resource 16 associated with the specified public name 18 was located. In this manner, the name hierarchy navigation logic 48 may be utilized with the name hierarchy 42 and a public name 18 to identify the locations of a reference 46 representing the resource 16 based on the public name 18.

The exemplary scenario 40 of FIG. 3 presents some advantages with respect to other techniques (including the exemplary scenario 30 of FIG. 2.) As a first example, the exemplary scenario 40 utilizes some resources that may already be available to the device 12, such as a file system and a set of hashing algorithms. Administrators may therefore examine the file system and the files contained therein that comprise the name hierarchy 42 through a more familiar interface (such as a file system explorer) than through a monolithic embodiment, such as the public name mapping component 32 of FIG. 2. As a second example, the use of already existing resources, such as a file system, may improve the scalability of the embodiment, since such resources may already be designed to provide high performance and reliability while servicing a comparatively large number of concurrent requests. The file system might therefore support concurrent access by a potentially large number of servers 34, e.g., by synchronizing the files and folders comprising the name hierarchy 42 among such servers 34 (such as in a "server farm" scenario.) Each server 34 may therefore utilize a local representation of the name hierarchy 42, and change thereto may be propagated among the servers 34 using file synchronization software that may already be available and in use to support other aspects of the server farm (such as the synchronization of portions of the resource set 14 distributed among the servers 34.) These and other advantages may be achievable based on the techniques illustrated in the exemplary scenario 40 of FIG. 3.

Figure 4:
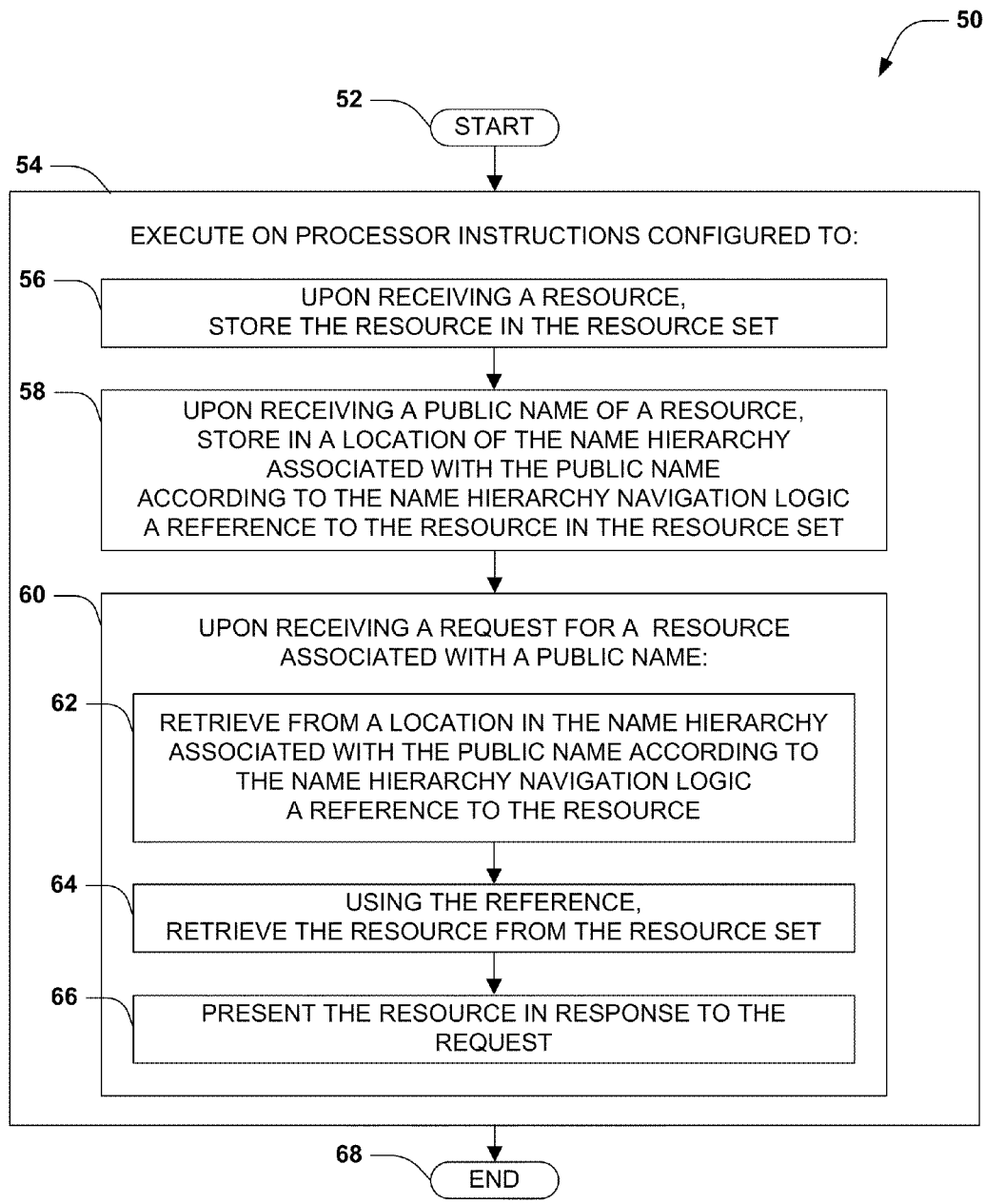
FIG. 4 is a flow chart illustrating an exemplary method of naming the resources of a resource set with one or more public names.

FIG. 4 presents a first exemplary embodiment of these techniques, illustrated as an exemplary method 50 of naming resources 16 stored in a resource set 14 of a device 12 having a processor, a name hierarchy 42, and a name hierarchy navigation logic 48 configured to, for the public name 18 of a resource 16, specify a location in the name hierarchy 42 where a reference to the resource 16 may be stored and/or located. The exemplary embodiment may comprise, e.g., a set of instructions residing in a memory of the device 12 and configured to perform the exemplary method 50. The exemplary method 50 may begin at 52 and may involve executing 54 on the processor instructions configured to perform the techniques discussed herein. In particular, the instructions may be configured to, upon receiving a resource 16, store 56 the resource 16 in the resource set 14. The instructions may also be configured to, upon receiving a public name 18 of a resource 16, store 58 at a location in the name hierarchy 42 associated with the public name 18 (according to the name hierarchy navigation logic 48) a reference 46 to the resource 16. Finally, upon receiving 60 a request 22 for a resource 16 associated with a public name 18, the instructions may be configured to retrieve 62 from a location in the name hierarchy 42 associated with the public name 18 (according to the name hierarchy navigation logic 48) a reference 46 to a resource 16 in the resource set 14; to, using the reference, retrieve 64 the resource 16 from the resource set 14; and to present 66 the resource 16 in response to the request 22. In this manner, the exemplary method 50 achieves the naming of the resource 16 with the public name 18 according to the techniques discussed herein, and so ends at 68.

Figure 5:
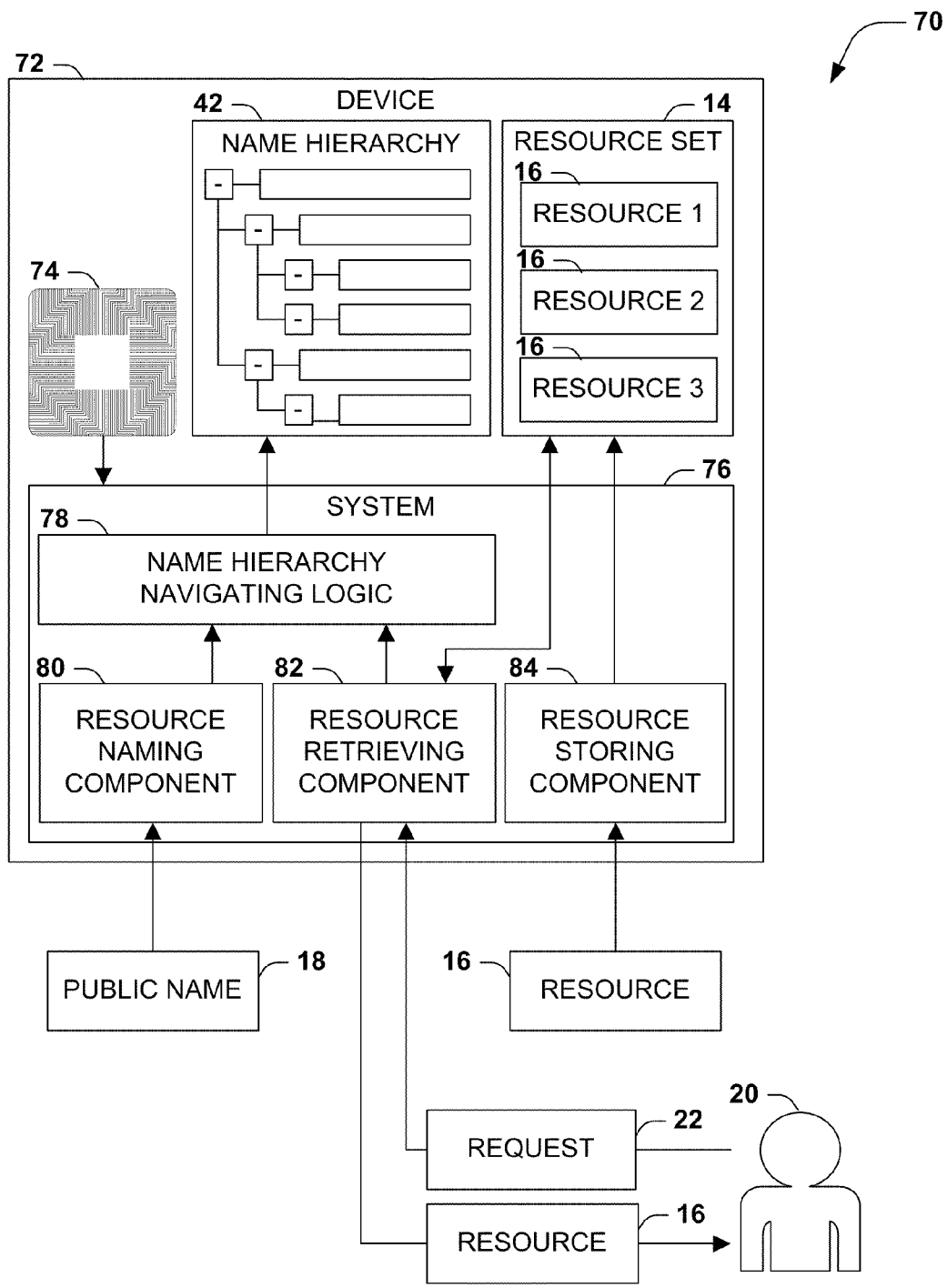
FIG. 5 is a component block diagram illustrating an exemplary system for naming the resources of a resource set with one or more public names.

FIG. 5 presents an exemplary scenario 70 featuring a second embodiment of these techniques, illustrated as an exemplary system 76 operating within a device 72 configured according to the techniques discussed herein. The device 72 may comprise, e.g., a processor 74, a name hierarchy 42 (e.g., a first portion of a file system designed for use as the name hierarchy 42), and a resource set 14 comprising a set of resources 16 that may be specified in requests 22 submitted by various clients, including users 20. The exemplary system 76 may comprise, e.g., a set of instructions stored in a memory of the device 72 and executing on a processor 74 of the device 72 and representing a set of software components that interoperate to perform the naming of the resources 16 with various public names 18 by implementing the techniques presented herein. The exemplary system 76 may comprise a name hierarchy navigation logic 78 configured to, for the public name 18 of a resource 16, specify a location in the name hierarchy 42 where a reference to the resource 16 may be stored and/or located. The exemplary system 76 may also comprise a resource storing component 80, which is configured to, upon receiving a resource 16, store the resource 16 in the resource set 14. The exemplary system 76 may also comprise a resource naming component 82, which is configured to, upon receiving a public name 18 of a resource 16, store at a location in the name hierarchy 52 associated with the public name 18 (according to the name hierarchy navigation logic 78) a reference 46 to the resource 16 in the resource set 14. The exemplary system 76 may also comprise a resource retrieving component 74, which is configured to, upon receiving a request 22 for a resource 16 associated with a public name 18, retrieve from a location in the name hierarchy 42 associated with the public name 18 (according to the name hierarchy navigation logic 78) a reference 46 to a resource 16 in the resource set 14. The resource retrieving component 74 is also configured to, using the reference 46, retrieve the resource 16 from the resource set 14, and present the resource 16 in response to the request 22. In this manner, the exemplary system 76 may enable the naming of resources 16 of the resource set 14 according to public names 18 specified therefore, in accordance with the techniques discussed herein.

Figure 6:
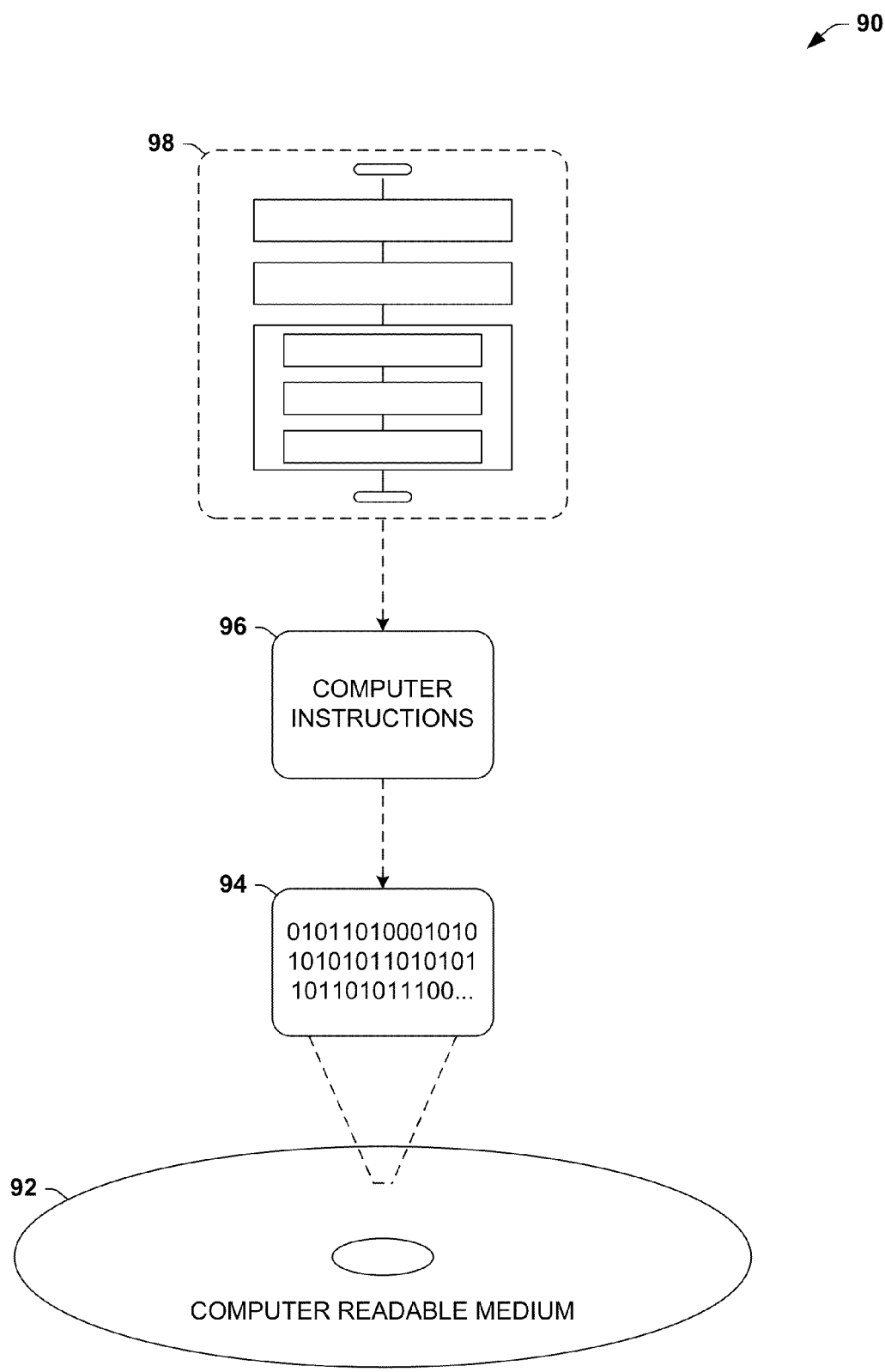
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of naming the resources of a resource set with one or more public names, such as the exemplary method 50 of FIG. 4. In another such embodiment, the processor-executable instructions 96 may be configured to implement a system for naming the resources of a resource set with one or more public names, such as the exemplary system 76 of FIG. 5. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 4 and the exemplary system 76 of FIG. 5) to confer individual and/or synergistic advantages upon such embodiments.

A first aspect that may vary among embodiments of these techniques relates to the scenario wherein these techniques may be utilized. A first exemplary scenario involves a computer that is configured to expose a resource set 14 to a client, such as a user 20, either locally or over a network. It may be advantageous to expose the resources 16 to the client in an organizational manner that is suggested by the public names 18 of the resources 16, but that differs from the actual names and organization of the resources 16 in the resource set 14. As one example, a webserver hosting a website may store resources 16 comprising website components of the website, such as web pages, scripts, compiled binaries representing web applications, style sheet definitions (such as cascading style sheets (CSS) and extensible stylesheet language (XSL) documents), data feeds (such as Real Simple Syndication (RSS) documents), and other data sets (such as extensible markup language (XML) documents.) The webserver may internally store these resources 16 according to a particular organization scheme, such as by grouping resources according to website, author, culture, or topic, but may wish to expose such resources 16 to visitors with public URLs of the website components that do not correspond to this organization scheme. As a first example, the administrator of the website may wish to present the web components with names that are easier to remember, easier to enter into the browser via text entry, or that suggest the type and content of the resource in order to promote proper indexing by a web search engine. As a second example, the administrator of the website may wish to promote the security of the website by removing some details of the organizational structure, or by providing resources 16 that users cannot directly request, but that may be internally referenced. For example, a data set represented as an XML document may be included in a set of web components, and may be internally referenced and retrieved by server-side scripts, but it may be desirable to restrict this document from user request by not assigning a public name 18 to this resource 16. The techniques discussed herein may be utilized to promote these scenarios, and may achieve some or all of these and other advantages.

A second exemplary scenario wherein these techniques may be utilized involves a set of computers or other devices that interoperate to provide the resource set 14 to clients. A device 12 may be configured to provide the resource set 14 to the set of computers according to the public names 16; e.g., a file server may internally organize the files in one manner, but may expose the files to clients over a network in another organization and with different public names 18 according to these techniques. In another scenario, the set of devices 12 may operate on the resource set 14 according to the internal names and structure, but may expose the resource set 14 to clients (such as users 20) in another organization or with different names. In this scenario, the computers may have to coordinate to propagate changes to the name hierarchy 42, along with changes to the resource set 14, so that all servers present the same resource set 14 to users. For example, when a resource 16 is added or changed, it may be problematic if some devices 12 present the updated resource 16 to clients, while other devices 12 (which have not yet received notification of the update) present the previous version of the resource 16 to clients. In a similar manner, it may be problematic if, after a change to the name hierarchy 42 (e.g., the association of a new public name 18 with a resource 16), some devices 12 present the updated name hierarchy 42 to users, while other devices 12 (which have not yet received notification of the update) present the non-updated name hierarchy 42 to users. Therefore, in scenarios involving a set of cooperating devices 12, it may be desirable to configure the devices not only to utilize the same name hierarchy 42 in presenting the resource set 14 based on the public names 18 to clients, but to propagate changes to the name hierarchy 42 as quickly as possible. The techniques discussed herein may therefore be utilized in these scenarios to promote the naming of the resource set 14 among such devices 12.

Figure 7:
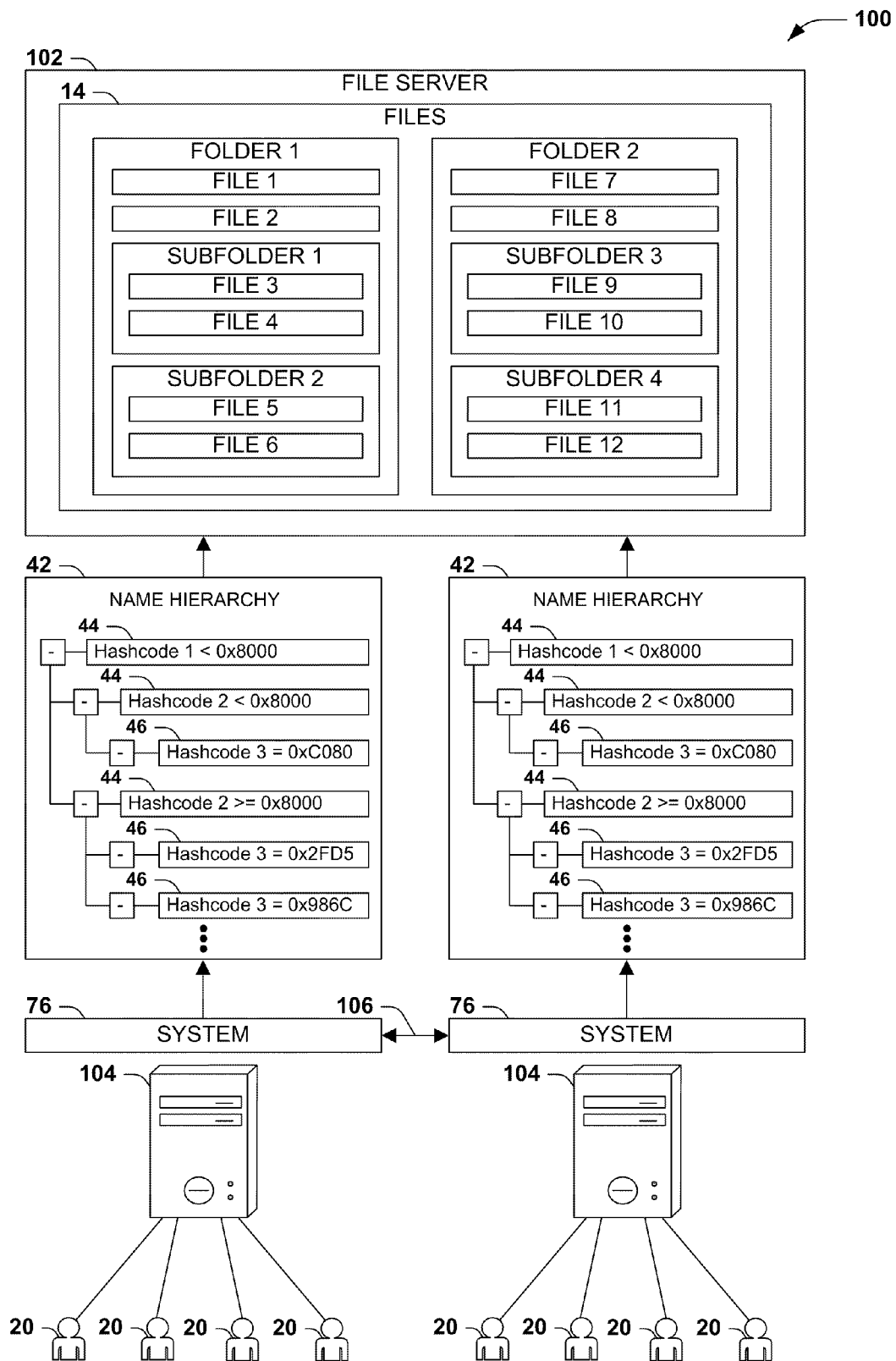
FIG. 7 is an illustration of an exemplary server farm scenario wherein the techniques discussed herein may be advantageously utilized.

FIG. 7 presents an exemplary scenario 100 featuring a portion of a server farm, comprising a file server 102 that stores a resource set 14 comprising a set of files in a particular structure, and that provides access to the resource set 14 to a set of users 20. The files may be presented to users 20 in a particular manner, e.g., by rendering the files into a website, or by applying a business logic layer that applies a potentially sophisticated set of rules to the manner of accessing the files. However, the file server 102 may be unable to apply the additional rendering logic to each request received from a user 20 in addition to simply serving the files involved therein, particularly if a large set of users 20 concurrently submits a large set of requests that involve detailed processing. Instead, one or more front-end servers 104 may be configured to access the files stored on the file server 102, to apply the additional processing (e.g., by requesting the files and rendering them into a web page and/or by applying the business logic), and to present the results to the users 20. It may be desirable to present the files with particular public names 18 that suggest a different organizational structure or different names than may be utilized internally by the file server 102. Therefore, in accordance with the techniques presented herein, a name hierarchy 42 may be developed, such as a portion of a file system structured to store references 46 to the files in the resource set 14, and the servers may access the name hierarchy 42 according to a name navigation hierarchy logic 78. To this end, each front-end server 104 may store a copy of the name navigation hierarchy logic 78, such as by allocating a portion of its file system to serve as the name hierarchy 42. Each front-end server 104 may also include an embodiment of these techniques (such as the exemplary system 76 of FIG. 5), and may utilize this embodiment to access the name hierarchy 42; e.g., when a user 20 submits a request 22 to the server 104 for a resource 16 identified by a public name 18, the front-end server 104 may invoke the embodiment to access its stored representation of the name hierarchy 42 and to retrieve a reference to the corresponding resource 16, which may then be requested from the file server 102 and presented to the user 20 in response to the request. Moreover, the front-end servers 104 may interact (through a synchronization process 106) to propagate changes to the name hierarchy 42. For example, upon storing a reference file in the file system comprising the name hierarchy 42, a front-end server 104 may send the reference file to other front-end servers; and upon receiving from another front-end server 104 a reference file to be stored at a location in the file system comprising the name hierarchy 42, a front-end server 104 may store the reference file at the location in the file system. In this manner, the front-end servers 104 may propagate changes to the name hierarchy 42 in order to present resources 16 to the users 20 with a consistent set of public names 18 by utilizing the techniques discussed herein.

A third exemplary scenario wherein these techniques may be utilized relates to a techniques involves a deployable computing environment. Recent attempts have been made to develop techniques for providing access to a computing environment among an array of devices in a consistent, deployable, and extensible manner. These techniques also seek to provide automated synchronization of data objects among all such devices, and the deployment of a common set of applications among the cooperating devices, and a centralized service for managing the procuring, installing, using, and uninstalling of applications among such devices. The set of data objects and applications is not necessarily identical among various devices; e.g., a workstation may contain a full copy of the data set and a large number of high-performance applications (e.g., photo editing software and graphically intensive games), while a cellphone device (having a smaller data store) may store only a subset of the data objects, and may feature portability applications (e.g., a GPS-based mapping software) that are not relevant to a non-portable workstation. However, many applications and data objects related thereto may be shared among such devices (e.g., a calendar application configured to manage a user calendar object), and the computing environment may be adapted to enable the distribution and synchronization of the application and data objects among such devices. It may therefore be appreciated that a computer system may be advantageously represented in a manner that enables the deployment of the computing environment among a set of devices.

In one such technique, the computing environment, including a set of applications, the application resources, and data objects used thereby, is represented in a manner that may be delivered to devices for rendering according to the capabilities of the device. The objects include the data objects of the computer system, such as the user files and data created by the user, as well as representations of the myriad devices comprising the computing environment of the user. A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the authoritative source of the information set, and thereby propagated to all other devices to which the information set is delivered.

Figure 8:
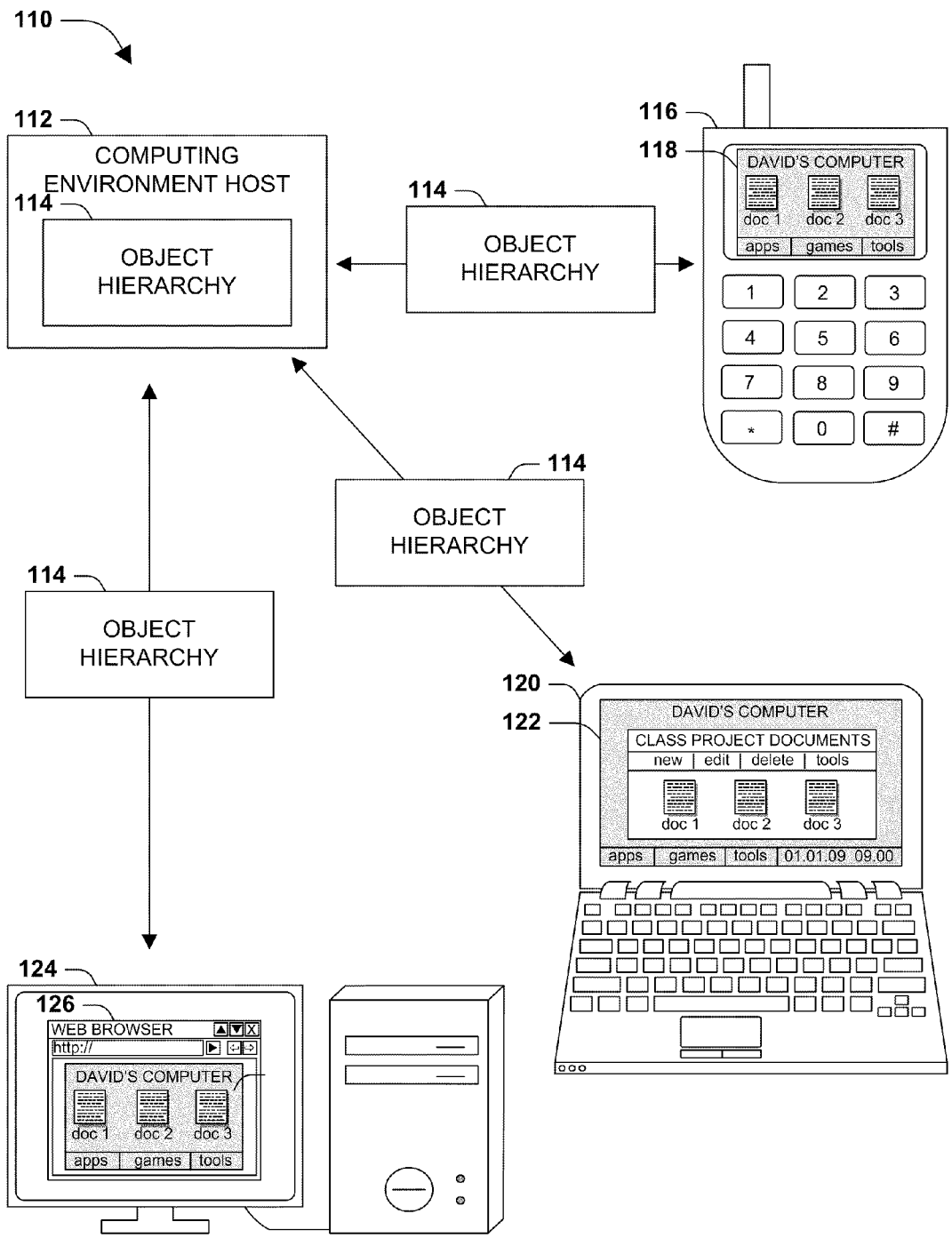
FIG. 8 is an illustration of an exemplary deployable computing environment scenario wherein the techniques discussed herein may be advantageously utilized.

FIG. 8 illustrates one such scenario 110, wherein the computing environment may be hosted by a computing environment host 112, which may store and manage an object hierarchy 114. The computing environment host 112 may also render the object hierarchy 114 in different ways on behalf of various devices, such as a cellphone device 116, a personal notebook computer 120, and a public workstation 124, and also on behalf of different types of users having different access privileges. Updates to the computing environment may be propagated back to the computing environment host 112, and may be automatically synchronized with other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment.

With respect to this exemplary scenario, the deployable computing environment may be represented as a resource set 14 comprising resources 16 that are to be presented to the user with public names 18 suggesting a unified structure of the data objects, regardless of which device actually hosts a particular data object and how the device internally references the data object. For example, the object hierarchy 114 may present to the user 20 a set of documents stored in a folder, while such documents might actually be stored on several devices, each having a different type of file system and different logic for naming such files. In order to achieve this consistent presentation, each device may host a representation of the name hierarchy 42 and an embodiment of these techniques (such as the exemplary system 76 of FIG. 5), and may utilize this embodiment to access the resources 16 according to the name hierarchy 42 according to the techniques presented herein. Changes to the name hierarchy 42 may also be propagated among the devices in order to maintain the consistent presentation to the user 20 of the public names 18 of the resources 16. Those of ordinary skill in the art may devise many scenarios wherein the techniques discussed herein may be advantageously utilized.

A second aspect that may vary among embodiments of these techniques relates to the variations in the architecture of the embodiment and/or the device 12 wherein the embodiment is utilized. As a first example of this second aspect, although these techniques may be implemented in an architecture resembling the exemplary system 76 of FIG. 5, other architectures may be available that also implement the techniques presented herein. For example, the name hierarchy navigating component 78 may be incorporated in the resource retrieving component 82 and/or the resource naming component 80.

As a second example of this second aspect, elements of these techniques (such as system 76) may be distributed over several devices 12. For example, a first device 12 may be configured to manage access to the resources 16 of the resource set 14, including storing the resources 16, while a second device 12 may be configured to handle the association of public names 18 with the resources 16 using the name hierarchy navigation logic 78, and one or more additional devices 12 may be configured to handle requests 24 for resources 16 specified by users 20 according to various public names 18.

As a third example of this second aspect, the name hierarchy navigation logic 78 may be implemented, e.g., in an imperative manner (e.g., a script that may be interpreted, or a compiled library such as a dynamic link library (DLL), that may be invoked by a device 12 to navigate the name hierarchy 42.) Alternatively, the name hierarchy navigation logic 78 may be implemented in a declarative manner (e.g., as an extensible markup language (XML) document that specifies the logic for navigating respective navigation levels 44 of the name hierarchy 42), or according to other techniques that might be known to those of ordinary skill in the art.

As a fourth example of this second aspect, a reference 46 to a resource 16 might simply describe the resource 16 (e.g., by indicating one or more identifiers of the resource 16, such as a distinctive name within the resource set 14), so that the resource retrieving component 82 may identify the associated resource 16 in the resource set 14. Alternatively, the reference 46 might be actively invokable to retrieve the referenced resource 16. For example, the reference 46 may be stored as a file system shortcut that links to the resource 16, or as a file system alias that actually appears within the name hierarchy 42 as a representation of the resource 16, such that an embodiment may retrieve the resource simply by copying the reference 46.)

As a fifth example of this second aspect, the resource set 14 and the name hierarchy 42 may be stored and/or managed by one device 12, such as illustrated in FIG. 5. For example, it may be advantageous to configure some or all of the servers 104 in a server farm scenario to operate on a name hierarchy 42 that is stored by a single device, such as a name hierarchy server that is dedicated to this task. This architecture may be helpful, e.g., for reducing synchronization problems, such that some or all of the servers 104 may retrieve and update name information from a single, authoritative source, and for reducing network traffic, particularly in scenarios where the name hierarchy 42 changes often. Alternatively, the resource set 14 and/or name hierarchy 42 may be stored and/or managed by different devices, such as, in FIG. 7, a file server 102 configured to store the resource set 14 (as a file system) and a set of front-end servers 104 that store the name hierarchy 42. While this architecture may involve synchronization processes (e.g., to promote the synchrony of the version of the name hierarchy 42 stored by each server 104 in the exemplary scenario 100 of FIG. 7), this architecture might improve the robustness of the server farm (since each server 104 may consult its own representation of the name hierarchy 42.) Additionally, network traffic might be reduced, particularly in scenarios where the name hierarchy 42 infrequently changes.

Figure 9:
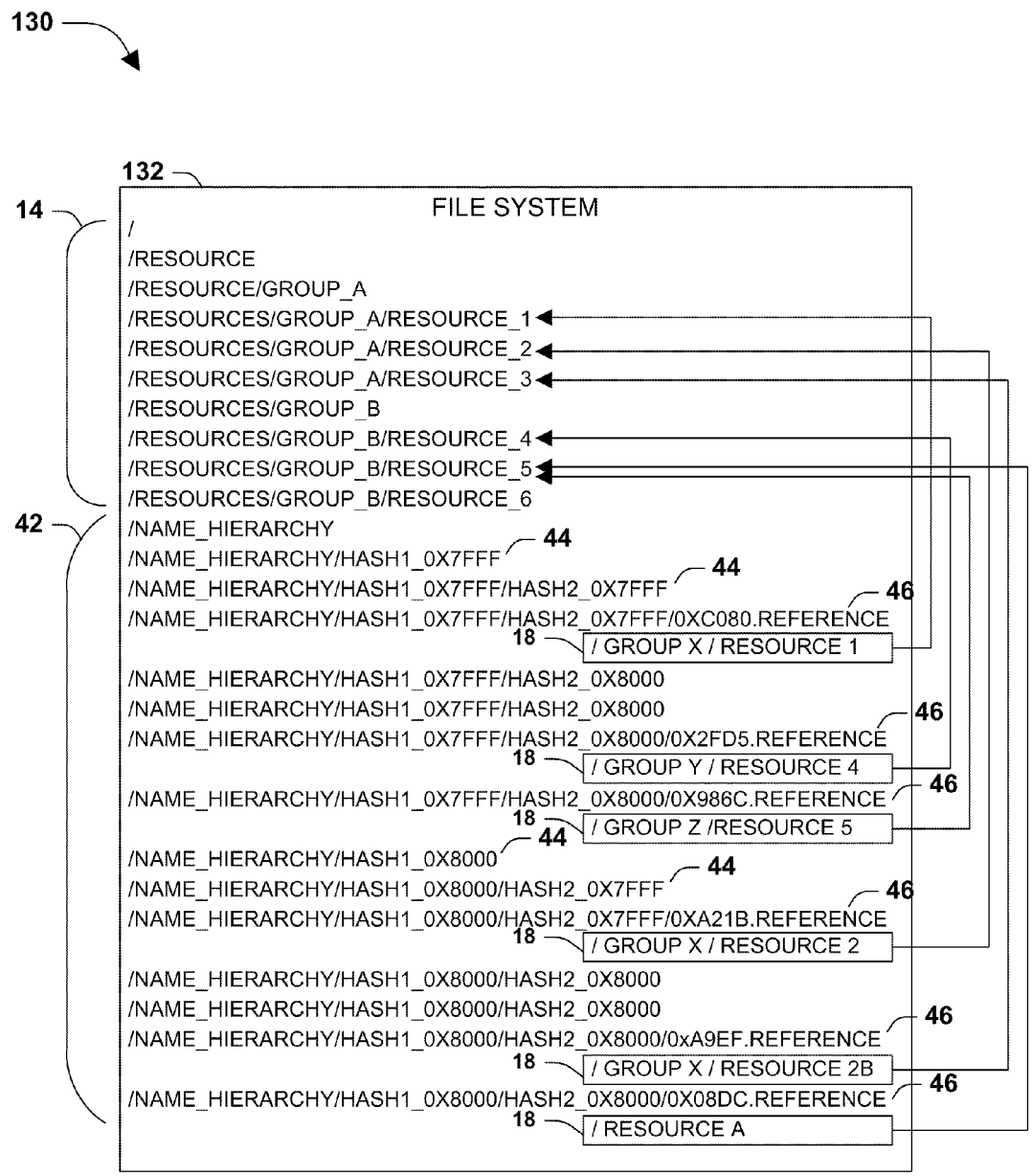
FIG. 9 is an illustration of an exemplary hierarchical data store (illustrated as a file system) that comprises both a resource set and a name hierarchy.

As one notable variation of this fifth example of this second aspect, it may be advantageous to store the resource set 14 and the name hierarchy 42 together, e.g., within the same file system or database. FIG. 9 presents an exemplary scenario 130 comprising a hierarchical data store, such as a file system 132, that stores both the resources 16 and the name hierarchy 42. The resource set 14 may be internally stored as a set of files in various folders, according to an internal storage scheme chosen by an administrator, and the name hierarchy 42 may be stored as a set of folders (each corresponding to a navigation level 44) containing a set of files (each representing a reference 46 and corresponding to a public name 18) that reference a resource 16. A device 12 having a hierarchical data store comprising both the resource set 14 and the name hierarchy 42 might be easier to administrate; e.g., a single synchronization process running on each of a set of such devices 12 (e.g., in a server farm scenario, such as the exemplary scenario 100 of FIG. 7) may achieve the synchronization among all such devices 12 of changes both to the resource set 14 and to the name hierarchy 42. Alternatively, it may be advantageous to store the resource set 14 and the name hierarchy 42 in different systems and/or locations; e.g., the discrete distribution of these resources in the exemplary scenario of FIG. 7 may promote security (e.g., by isolating the resources at the file server 102, which may be more tightly secured, and by allocating the less significant name hierarchy 42 among the client-facing front-end servers 104 with fewer security measures.)

As a fifth example of this second aspect, a reference 46 might identify the public name 18 associated with the reference 46. Alternatively, it may be desirable to obscure the public names 18 associated with the references 46. For example, in the exemplary scenario 130 of FIG. 9, it may be appreciated that the references 46 may not actually indicate the public name 18 associated therewith; rather, the name hierarchy navigation logic 78 might process a particular public name 18 in a manner that navigates to a particular reference 46. In this manner, it may be easy to identify the reference 46 associated with a particular public name 18, but it may be difficult to identify a public name 18 that corresponds to a particular reference 46. This one-way mapping may be desirable, e.g., in order to promote the security of the resource set 16 if the name hierarchy 42 is compromised. Those of ordinary skill in the art may devise many architectural variations among implementations of the techniques discussed herein.

A third aspect that may vary among embodiments of these techniques relates to the manner of choosing public names 18 for the resources 16 of the resource set 14. As a first example of this third aspect, a default public naming logic may be defined, such that when a new resource 16 is received and stored in the resource set 14, a default public name 18 may be generated for the resource 16, and a reference 46 to the resource 16 within the resource set 14 may be stored at a location in the name hierarchy 42 associated with the default public name 18 (where the location of the reference 46 is selected according to the name hierarchy navigation logic 78.) For example, the default public name 18 of a resource 16 may be selected to match the native location and name of the resource 16 within the resource set (e.g., a file stored in "/Files/A/File 1" may be assigned a default public name of "/Group A/File 1"), but may be removable or changeable by an administrator to a more desirable public name 18. Alternatively, an embodiment may be configured not to associate a default public name 18 with a new resource 16 added to the resource set 14, in order to prevent an automated publication of any resource 16 upon adding it to the resource set 14.

Figure 10:
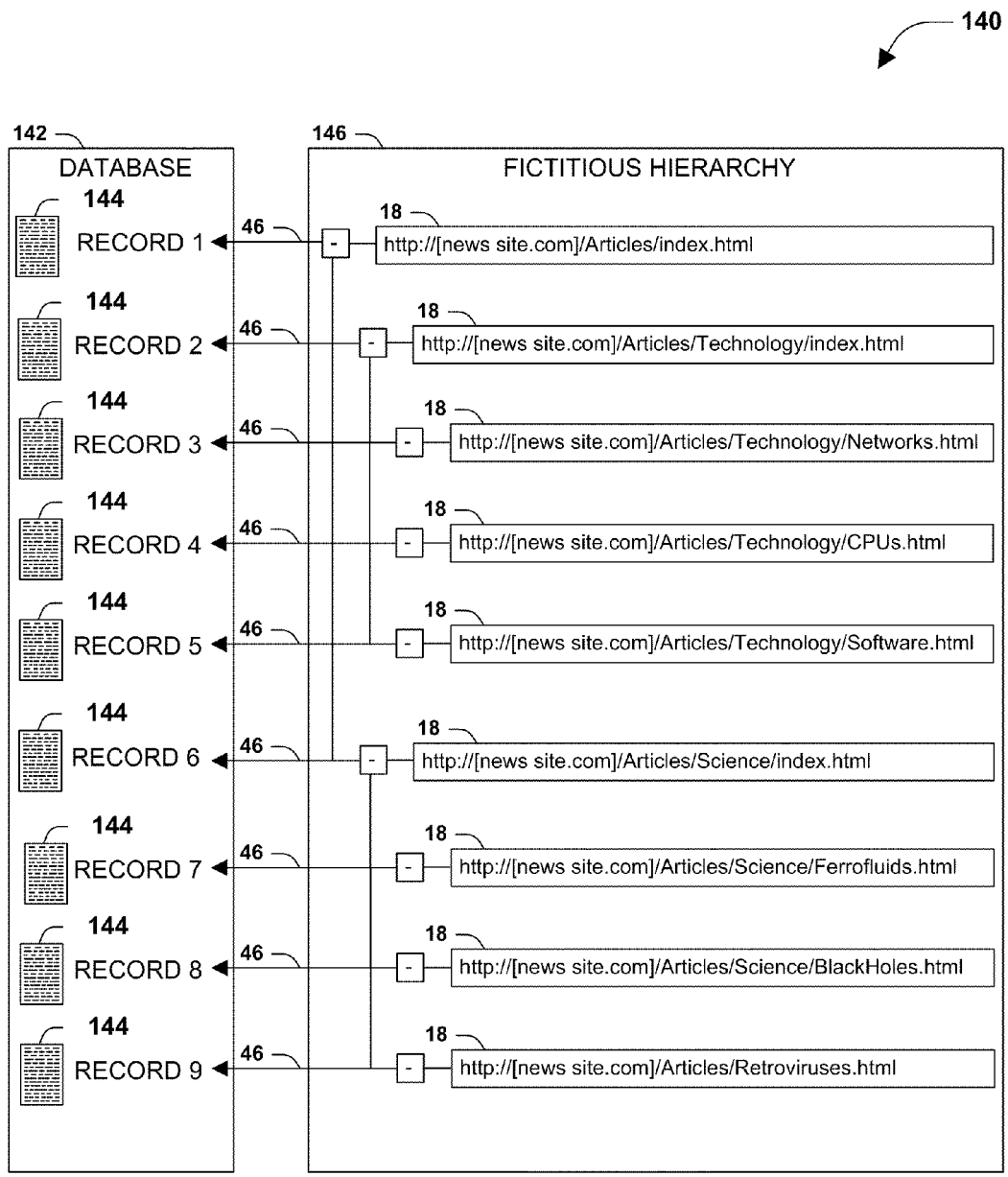
FIG. 10 is an illustration of an exemplary set of public names of resources in a resource set that suggests a fictitious hierarchy of the resource set.

As a second example of this third aspect, the public names 18 associated with various resources 16 may be selected (automatically or by an administrator) to reflect some aspect of the organization and names of the resources 18 stored in the resource set 14. For example, in the exemplary scenario 130 of FIG. 9, the resources 16 of the resource set 14 may be stored in a particular organizational logic, such as files organized into groups as in the resource set 14 of FIG. 2, and the public names 18 of such resources 16 may be selected to reflect this structure, e.g., a public name 18 of "/Group A/Resource 1" may correspond to the resource 16 named "/Resources/Group_A/Resource_1". The techniques discussed herein may therefore allow some variations in the public names 18 (such as converting underscores to spaces and removing an undesirable first portion of the filenames) that provide a more easily readable public name 18, while nevertheless reflecting the internal structure and names of the resource set 14. Additionally, these techniques might also permit other features, such as changing a name of a resource 16, permitting aliases of resources 16, and restricting a resource 18 from public access by removing the associated public name 18. Alternatively, the public names 18 may significantly or completely diverge from the internal structure and names of the resources 16, thereby presenting to clients (such as users 20) a fictitious hierarchy that does not resemble the actual hierarchy of the resource set 14. FIG. 10 presents one such scenario, featuring a resource set 14 illustrated as a database 142 comprising resources 16 stored as database records 144. For example, the resources 16 might represent news articles, and may be internally identified in the database by a distinctive number selected sequentially or at random and representing a key of the database table (such as record number 1483.) However, when an article is presented to a user 20, it may be presented with a more friendly public name 18 (e.g., "http://www.[news website].com/Articles/Science/Ferrofluids.html"). The public names 18 of the resources 16 thereby suggest a fictitious hierarchy 146 that does not correspond to the organization or names of the resources 16 stored in the resource set 14. This fictitious hierarchy 146 may be appreciated by a user 20, and/or may facilitate a web search engine in properly indexing a link to the article according to the resource type and semantic content suggested by the public name 18. Those of ordinary skill in the art may devise many techniques for choosing public names 18 of resources 16 while implementing the techniques discussed herein.

A fourth aspect that may vary among embodiments of these techniques relates to the manner of organizing the name hierarchy 42, and of navigating the name hierarchy 42 according to the name hierarchy navigation logic 76 and based on a public name 18. As a first example of this fourth aspect, the name hierarchy navigation logic 76 may position all references 46 at the same depth within the name hierarchy 42, e.g., with the same number of navigation levels 44, or may place some references 46 at a different depth than other references 46. For example, based on a criterion of the name hierarchy navigation logic 76, a first navigation for a first navigation level 44 within the name hierarchy 46 may lead to a folder containing references to a small set of more popular or frequently submitted public names 18, or to a folder set (involving further navigation levels 44) with more deeply nested subfolders containing references 46 corresponding to less popular or less frequently submitted public names 18. This differential staging may be useful, e.g., for servicing a small set of frequently submitted public names 18 faster, while also permitting a much larger set of less frequently submitted public names 18 to be processed in a marginally slower manner.

As a second example of this fourth aspect, in order to determine how to navigate a particular navigation level 44 of the name hierarchy 42, the public name 18 may be processed in whole (e.g., by hashing the entire public name 18, or based on the length of the public name 18.) Alternatively, the public name 18 may be evaluated as one or more parts. For example, the public name 18 may be separated into portions divided by a separator, such as a path separator character, and by evaluating each portion in series in order to navigate different navigation levels 44.) In one such example, resources 16 stored in the resource set 14 have one or more metadata items that describe the resource 16, such as the date of creation, the name of the author, or the country, culture, or language to which the resource 16 is targeted. A reference 16 may be stored in the resource set 14 according to one or more of such metadata items; e.g., resources 16 targeted to a first culture might be stored in a first table of a database or a first folder of a file system, while resources 16 targeted to a second culture might be stored in a second database table or a second file system folder. Additionally, the public names of the resources 18 may be associated with such metadata items, such as by including in the public name 18 of a resource 16 a reference to the culture to which it is targeted (e.g., "http://www.[news site].com/en-us/index.html"). The name hierarchy navigation logic 62 may then specify a navigating of at least one navigation level 44 according to the metadata items embedded in the public name 18.

As a third example of this fourth aspect, different navigation levels 44 within the name hierarchy 52 may specify similar criteria for navigating the next navigation level 44, or may specify different criteria. For example, a first navigation level 44 might specify a hashing of the public name 18 with a first hashing algorithm. For some public names 18 hashing in a similar manner (e.g., those having hash values within a particular range), the name hierarchy navigation logic 76 might specify a second navigation level 44 involving a hashing according to a second hashing algorithm; while for other public names 18, the name hierarchy navigation logic 76 might specify a second navigation level 44 involving a hashing according to a third hashing algorithm, or according to another criterion, e.g., by examining a culture specified in the public name 18.

As a fourth example of this fourth aspect, the name hierarchy navigation logic 87 may specify many techniques may be utilized to specify the criteria of evaluating a public name 18 in order to navigate at a particular navigation level 44 of the name hierarchy 42. However, the use of the hashing technique in the name hierarchy navigating logic 48, as illustrated in the exemplary scenario 40 of FIG. 3, may present some advantages over other techniques. As a first example, the use of hashing to navigate at a particular navigation level 44 (e.g., by choosing a particular subfolder of a location within the file system) may promote a more even distribution of references 46 within the name hierarchy 42. For example, the name hierarchy navigating logic 48 may specify another criterion for navigating at a particular navigation level 44, such as an evaluation of the length of the public name 18 (e.g., references 46 for public names 18 under a particular length are stored in a first subfolder, and references 46 for public names 18 over the length are stored in a second subfolder.) However, this criterion may often lead to an uneven distribution of references 46 among the name hierarchy 42 (e.g., if many public names 18 happen to be long, the second subfolder may contain many more references 46 than the first subfolder), thereby potentially increasing the risk of a collision (e.g., where two public names 18 stored in the same subfolder happen to hash to the same hashcode, and therefore create a naming conflict) and decreasing the performance of the device 12 (e.g., because many references 18 may be stored in a particular folder, potentially increasing the search time to identify the file having a particular name.) The hashing of the public names 18 may promote a more uniform distribution of references 46 among the name hierarchy 42, thereby promoting performance and reducing the incidence of collisions. As a second example, the name hierarchy 42 may be organized based on the name hierarchy navigation logic 48, rather than the public names 18 of the resources 16. This may promote some flexibility in the assignment of public names 18. For example, if the folders and files of a file system used to store the public names 18 are named based on portions of the public name 18, then some restrictions of the file system may limit the set of acceptable public names 18; e.g., public names 18 may not be selectable where the corresponding files and folders of the reference 46 in the name hierarchy 42 exceed a maximum file name length of the file system, or that include characters that are disallowed by the file system.

By contrast, if the folders and files are named based on hashcode values (e.g., the references 46 may be named based on the four characters comprising the third hashcode of the public name 18), then any public name 18 may be acceptable and may be mapped to a conveniently short name of the file comprising the reference 46.

Figure 11:
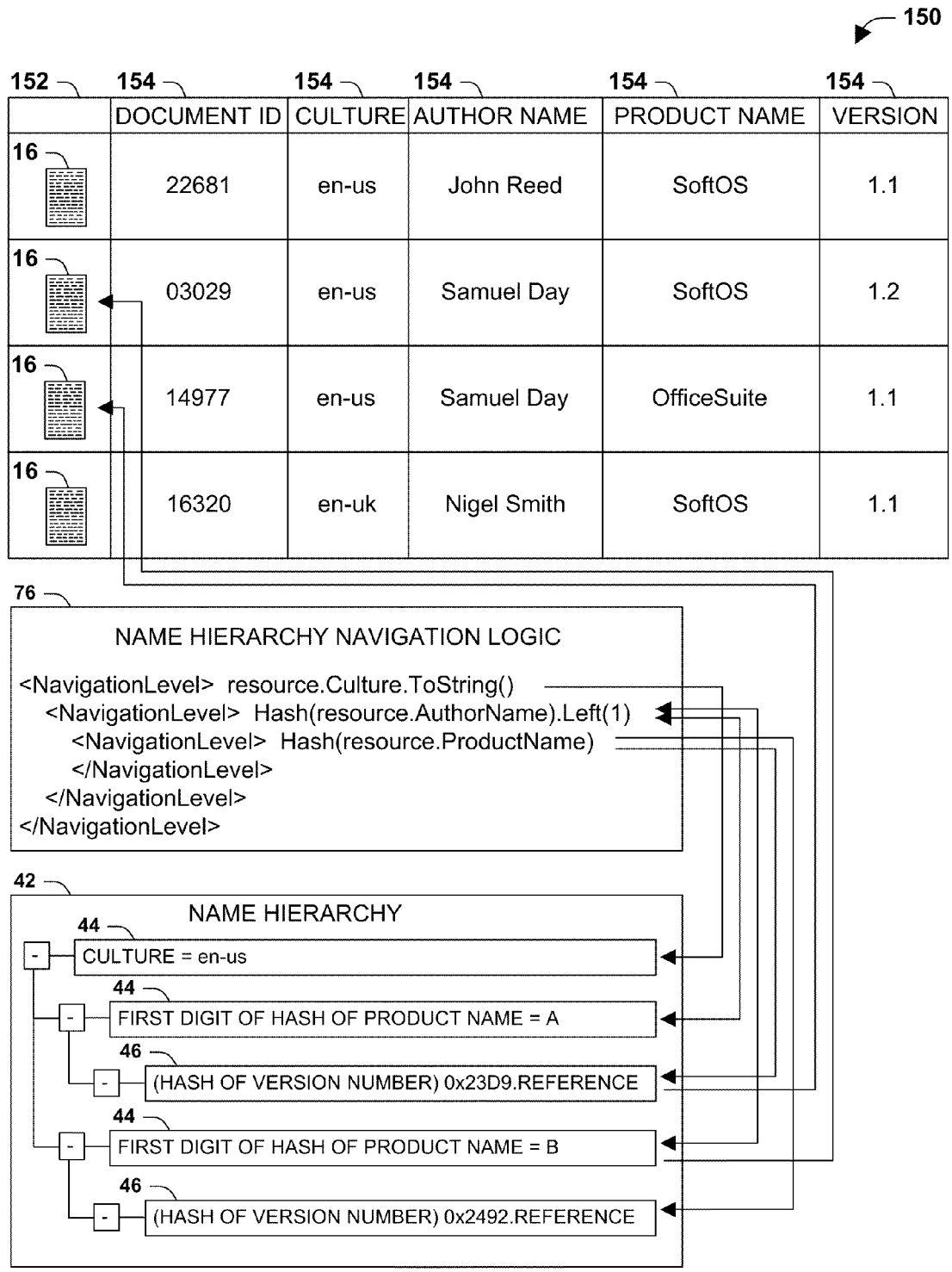
FIG. 11 is an illustration of an exemplary name hierarchy navigation logic that may specify a navigation of a name hierarchy according to some metadata items included in public names of resources having such metadata items.

FIG. 11 presents an exemplary scenario 150 utilizing several of these techniques. In this exemplary scenario 150, a resource set 14 is presented as a database table 152 configured to resources 16 representing a document for an application resource (e.g., a user manual.) The database table 152 is configured to store various metadata items 154 of the application resources described by each document, such as the document ID (which may serve as a key of the database table 152), the culture, the author name, the product name, and the version. Moreover, the public name 18 attributed to any such application resource may specify some of these metadata items 154, e.g., "http://[file server.com]/en-us/SoftOS/v1.1/UserManual.html". The name hierarchy navigation logic 76 may rely on the metadata items 154 embedded in these public names 18 while specifying a navigation through the name hierarchy 42. Moreover, some of these navigation levels may involve hashing in order to promote a more even distribution of references 46 within the name hierarchy 42. For example, the name hierarchy navigation logic 76 may specify a first navigation level 44 based on the culture specified in the URL, but may specify a second navigation level 44 based on a hashcode of the product name to which the document belongs (derived by hashing the product name specified in the public name 18 with a first hashing algorithm), and a third navigation level 44 based on a hashcode (generated with the same hashing algorithm or a different hashing algorithm) of the version number indicated in the public name 18. In this manner, the navigation name hierarchy logic 76 may rely on various metadata items 154 specified in the public name 18 submitted with a request 22 for a resource 18 in order to navigate at least one navigation level 44 of the name hierarchy 42 while storing or retrieving a reference 46 to the resource 16. Those of ordinary skill in the art may devise many techniques for configuring the name hierarchy navigation logic 76 to navigate the name hierarchy 42 according to a public name 18 while implementing the techniques discussed herein.

A fifth aspect that may vary among embodiments of these techniques relates to the manner of retrieving and presenting a resource 16 to a client (such as a user 20) in response to a request 22 specifying a public name 18. As a first example of this fifth aspect, when the resource 16 is presented, it may be presented with the public name 18 (e.g., a request for a web page received from a user 20 may be fulfilled by also specifying the public name 18 of the web page that is to appear in an address bar of the user's web browser.) The public name 18 presented with the resource 16 might comprise the same public name specified in the request 22, or might comprise a new public name 18, such as a friendly name of the resource 16 specified by an administrator of the resource set 14 in order to promote the indexing by a search engine.

As a second example of this fifth aspect, a resource 16 may have a variable number of public names 18 represented in the name hierarchy 42. While some resources 16 might only have one public name 18, others might have a plurality of public names 18 (each representing an alias of the same resource 16.) Still other resources might have no reference 46 stored in the name hierarchy 42. Such resources therefore have no public name 18, and therefore cannot be requested by the public. This may be useful, e.g., for adding a resource 16 to the resource set 14 but temporarily or permanently withholding publication and public availability of the resource. For example, a webserver might feature a resource 16 of the resource set 14 that comprises a web component, such as a cascading stylesheet (CSS) document that might specify the manner of formatting particular elements. While the webserver might internally use this document, e.g., in order to format various web pages according to a consistent visual style, it may be desirable for the webserver to use this document only internally, and therefore restrict access to members of the public. Therefore, the document may have an internal name, but no reference 46 to the document may exist in the name hierarchy 42, and therefore no public name 18 may be used to request the document.

As a third example of this fifth aspect, an embodiment may be configured to handle exceptional cases where a public name 18 of a resource 16 is not available. For example, an embodiment (such as a resource retrieving component 82 in the exemplary embodiment 76 of FIG. 5) may be configured to, upon failing to retrieve a reference 46 to the resource 16 in the resource set 14, return a not found message (such as a 404 error code defined in the hypertext transport protocol (HTTP) specification) in response to a request 22 for the resource 16. Additionally, it may be desirable to permit a public name 18 to be redirected, e.g., to a second public name 18. Therefore, a first reference 46 corresponding to a first public name 16 might be associated not with a resource 16, but rather with a second public name 18 (or with a second reference 46 corresponding thereto.) The first reference 46 might therefore serve as a redirecting reference that, in response to a request 22 specifying the first public name 18, might indicate a second public name 18 that is to be used for the resource 16. An embodiment of these techniques might simply return the redirecting reference, and the client (such as the user 20) that submitted the request 22 might submit a second request 22 specifying the second public name 18. Alternatively, an embodiment might simply utilize the second reference 22 to retrieve the resource 16 from the resource set 14, and may present the resource 16 in response to the request 22 (and might also present the second public name 18, e.g., for display in the title bar of a browser operated by the user 20, in order to notify the user 20 of the second public name 18 of the resource 16.) Those of ordinary skill in the art may devise many techniques for presenting the resources 16 in response to requests 22 in accordance with the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
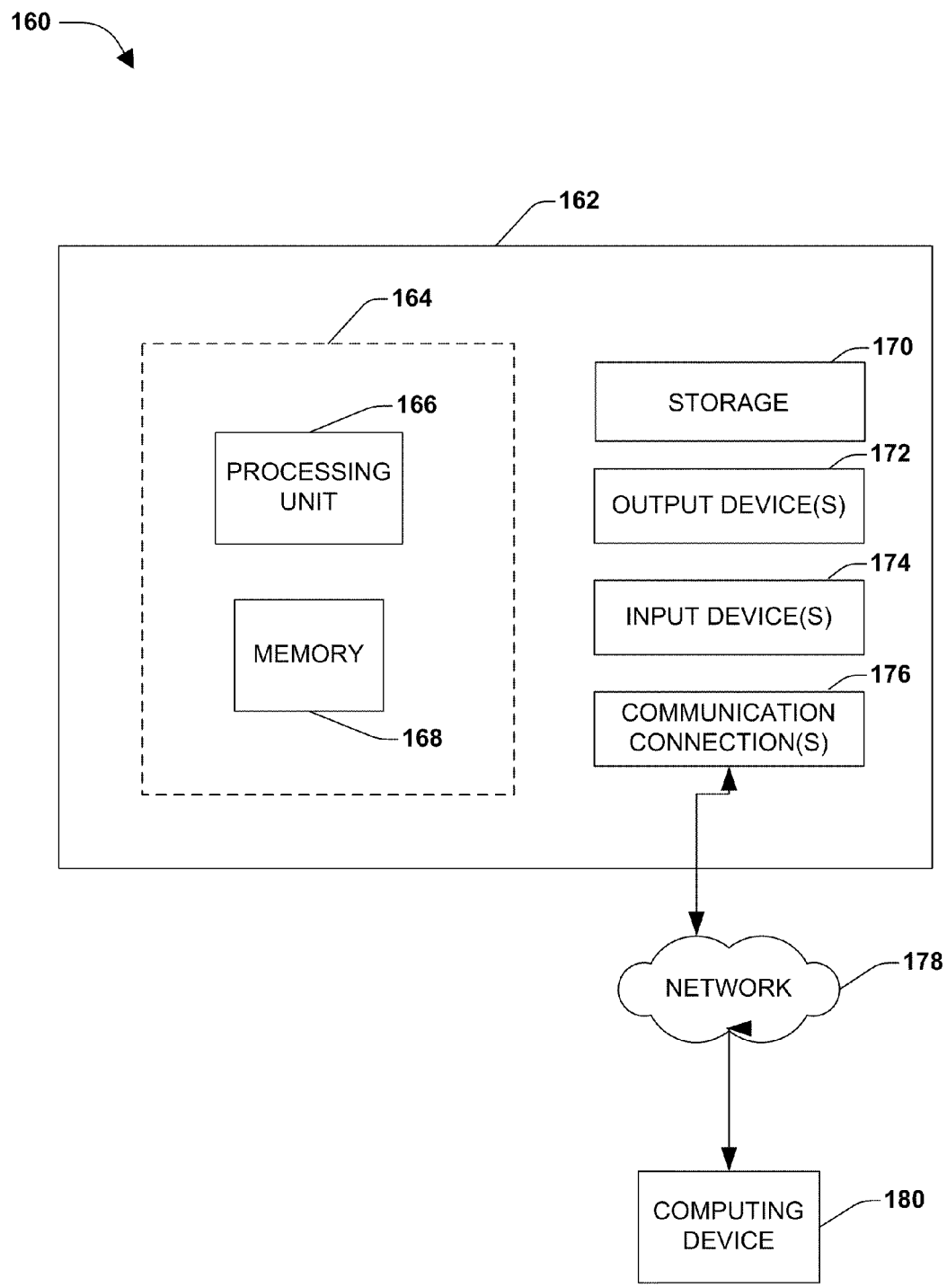
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 160 comprising a computing device 162 configured to implement one or more embodiments provided herein. In one configuration, computing device 162 includes at least one processing unit 166 and memory 168. Depending on the exact configuration and type of computing device, memory 168 may be volatile (such as RAM, for example), non-volatile (such as ROM, flash memory, etc., for example) or some combination of the two. This configuration is illustrated in FIG. 12 by dashed line 164.

In other embodiments, device 162 may include additional features and/or functionality. For example, device 162 may also include additional storage (e.g., removable and/or non-removable) including, but not limited to, magnetic storage, optical storage, and the like. Such additional storage is illustrated in FIG. 12 by storage 170. In one embodiment, computer readable instructions to implement one or more embodiments provided herein may be in storage 170. Storage 170 may also store other computer readable instructions to implement an operating system, an application program, and the like. Computer readable instructions may be loaded in memory 168 for execution by processing unit 166, for example.

The term "computer readable media" as used herein includes computer storage media. Computer storage media includes volatile and nonvolatile, removable and non-removable media implemented in any method or technology for storage of information such as computer readable instructions or other data. Memory 168 and storage 170 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 162. Any such computer storage media may be part of device 162.

Device 162 may also include communication connection(s) 176 that allows device 162 to communicate with other devices. Communication connection(s) 176 may include, but is not limited to, a modem, a Network Interface Card (NIC), an integrated network interface, a radio frequency transmitter/receiver, an infrared port, a USB connection, or other interfaces for connecting computing device 162 to other computing devices. Communication connection(s) 176 may include a wired connection or a wireless connection. Communication connection(s) 176 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 162 may include input device(s) 174 such as keyboard, mouse, pen, voice input device, touch input device, infrared cameras, video input devices, and/or any other input device. Output device(s) 172 such as one or more displays, speakers, printers, and/or any other output device may also be included in device 162. Input device(s) 174 and output device(s) 172 may be connected to device 162 via a wired connection, wireless connection, or any combination thereof. In one embodiment, an input device or an output device from another computing device may be used as input device(s) 174 or output device(s) 172 for computing device 162.

Components of computing device 162 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 162 may be interconnected by a network. For example, memory 168 may be comprised of multiple physical memory units located in different physical locations interconnected by a network.

Those skilled in the art will realize that storage devices utilized to store computer readable instructions may be distributed across a network. For example, a computing device 180 accessible via network 178 may store computer readable instructions to implement one or more embodiments provided herein. Computing device 162 may access computing device 180 and download a part or all of the computer readable instructions for execution. Alternatively, computing device 162 may download pieces of the computer readable instructions, as needed, or some instructions may be executed at computing device 162 and some at computing device 180.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of naming resources stored in a resource set of a device having a processor, a name hierarchy, and a name hierarchy navigation logic, the method comprising:
executing on the processor instructions configured to:
upon receiving a resource, store the resource in the resource set;
upon receiving a public name of a resource:
using the name hierarchy navigation logic, compute, from the public name, an identifier associated with a location in the name hierarchy, and
store, at the location in the name hierarchy associated with the identifier, a reference to the resource in the resource set; and
upon receiving a request for a resource associated with a public name:

using the name hierarchy navigation logic, compute, from the public name, the identifier associated with the location in the name hierarchy;

retrieve, from the location in the name hierarchy associated with the identifier, the reference to a resource in the resource set;

using the reference, retrieve the resource from the resource set; and present the resource in response to the request.

2. The method of claim 1:

the device comprising a webserver hosting a website;

the resource comprising a website component of the website; and the public name comprising a public URL of the website component.

3. The method of claim 1:

the device represented in a deployable computing environment;

the resource comprising a data object represented in the deployable computing environment; and the public name comprising a name of the data object within the deployable computing environment.

4. The method of claim 1, the device having a hierarchical data store comprising the resource set and the name hierarchy.

5. The method of claim 1, storing the resource in the resource set comprising:

using a default public naming logic, generating a default public name of the resource; and storing at a location in the name hierarchy associated with the default public name according to the name hierarchy navigation logic a reference to the resource in the resource set.

6. The method of claim 1:

respective resources having at least one metadata item; and storing the resource in the resource set comprising: storing the resource in the resource set according to at least one metadata item of the resource.

7. The method of claim 6:

the public name of at least one resource associated with at least one metadata item of the resource; and the name hierarchy navigation logic specifying navigating at least one hierarchical level of the name hierarchy according to the at least one metadata item associated with the public name.

8. The method of claim 1, the public name of at least one resource suggesting a fictitious hierarchy of the resource set.

9. The method of claim 1, the name hierarchy navigation logic specifying navigating at least one hierarchical level of the name hierarchy by:

computing a hashcode of at least a portion of the public name, and using the hashcode, navigating the navigation level in the name hierarchy.

10. The method of claim 1, presenting the resource comprising: presenting the resource with the public name.

11. The method of claim 1, at least one resource having no reference stored in the name hierarchy.

12. The method of claim 1, the instructions configured to, upon failing to retrieve a reference to the resource in the resource set, return a not found message in response to the request.

13. The method of claim 1, the instructions configured to, upon receiving a second public name of the resource, store in a location of the name hierarchy associated with the second public name according to the name hierarchy navigation logic a redirecting reference to the first public name.

14. A system configured to present resources stored in a resource set of a device comprising a processor and a memory and having access to a name hierarchy, the system comprising:

a name hierarchy navigation logic comprising instructions stored in the memory that, when executed on the processor, cause the device to, for a public name of a resource, compute an identifier associated with a location in the name hierarchy of a reference to the resource;

a resource storing component comprising instructions stored in the memory that, when executed on the processor, cause the device to, upon receiving a resource, store the resource in the resource set;

a resource naming component comprising instructions stored in the memory that, when executed on the processor, cause the device to, upon receiving a public name of a resource:

using the name hierarchy navigation logic, compute, from the public name, an identifier associated with a location in the name hierarchy, and store, at the location in the name hierarchy associated with the identifier, a reference to the resource in the resource set; and a resource retrieving component comprising instructions stored in the memory that, when executed on the processor, cause the device to, upon receiving a request for a resource associated with a public name:

using the name hierarchy navigation logic, compute, from the public name, the identifier associated with the location in the name hierarchy;

retrieve, from the location in the name hierarchy associated with the identifier, the reference to the resource in the resource set;

using the reference, retrieve the resource from the resource set; and present the resource in response to the request.

15. The system of claim 14:

the device comprising a webserver hosting a website;

the resource comprising a website component of the website; and the public name comprising a public URL of the website component.

16. The system of claim 14:

the device represented in a deployable computing environment;

the resource comprising a data object represented in the deployable computing environment; and the public name comprising a name of the data object within the deployable computing environment.

17. The system of claim 14:

the name hierarchy comprising at least a portion of a file system; and the reference comprising a reference file stored at a location of the file system referencing the resource stored in the resource set.

18. The system of claim 17:

the device comprising a first server in a server set including a second server; and the instructions configured to:

upon storing the reference file in the file system, send the reference file to the second server; and upon receiving from the second server a second reference file to be stored at a second location in the file system, store the second reference file at the second location in the file system.

19. The system of claim 17, the file system configured to store the name hierarchy and the resource set.

20. A computer-readable memory device storing instructions that, when executed on a processor of a device having a name hierarchy and a name hierarchy navigation logic, cause the device to name resources of a resource set, by:

upon receiving a resource, storing the resource in the resource set;

upon receiving a public name of a resource:
  using the name hierarchy navigation logic, computing, from the public name, an identifier specifying associated with a location in the name hierarchy for the public name, and
  storing, at the location in the name hierarchy associated with the identifier, a reference to the resource in the resource set; and upon receiving a request for a resource associated with a public name:
  using the name hierarchy navigation logic, computing, from the public name, the identifier associated with the location in the name hierarchy;
  retrieving, from the location in the name hierarchy associated with the identifier, the reference to a resource in the resource set;
  using the reference, retrieving the resource from the resource set; and
  presenting the resource in response to the request.

\* \* \* \* \*